United States Patent
Jalali

(10) Patent No.: US 10,833,824 B2
(45) Date of Patent: Nov. 10, 2020

(54) SELF-CONFIGURABLE MESH NETWORK FOR WIRELESS BROADBAND ACCESS

(71) Applicant: Ahmad Jalali, Rancho Santa Fe, CA (US)

(72) Inventor: Ahmad Jalali, Rancho Santa Fe, CA (US)

( * ) Notice: Subject to any disclaimer, the term of this patent is extended or adjusted under 35 U.S.C. 154(b) by 110 days.

(21) Appl. No.: 16/148,955

(22) Filed: Oct. 1, 2018

(65) Prior Publication Data
US 2020/0106582 A1  Apr. 2, 2020

(51) Int. Cl.
*H04L 5/00* (2006.01)
*H04B 17/318* (2015.01)
*H04W 84/18* (2009.01)
*H04W 88/04* (2009.01)
*H04W 88/08* (2009.01)

(52) U.S. Cl.
CPC ......... *H04L 5/0048* (2013.01); *H04B 17/318* (2015.01); *H04W 84/18* (2013.01); *H04W 88/04* (2013.01); *H04W 88/08* (2013.01)

(58) Field of Classification Search
CPC ........ H04L 5/0048; H04W 88/04; H04W 4/04
See application file for complete search history.

(56) References Cited

U.S. PATENT DOCUMENTS

| | | | | |
|---|---|---|---|---|
| 5,115,243 A * | 5/1992 | Perry | ....................... | G01S 7/282 342/137 |
| 7,941,135 B2 * | 5/2011 | Abusch-Magder | ........................ | H04B 17/345 455/422.1 |
| 8,625,547 B1 * | 1/2014 | Miller, II | ................... | 370/310.2 |
| 8,982,772 B2 * | 3/2015 | Fischer | .................. | H04K 3/822 370/310 |
| 9,838,896 B1 * | 12/2017 | Barnickel | ............ | H04B 17/318 |
| 10,306,524 B2 * | 5/2019 | Axmon | .................. | H04W 24/10 |
| 10,469,156 B1 * | 11/2019 | Barzegar | ............... | H04W 36/14 |
| 10,476,128 B1 * | 11/2019 | Kim | ....................... | H02J 50/12 |
| 10,536,924 B2 * | 1/2020 | Hwang | ............... | H04W 52/367 |
| 2007/0197262 A1 * | 8/2007 | Smith | .................... | H04B 3/542 455/562.1 |
| 2007/0225029 A1 * | 9/2007 | Abusch-Magder | ... | H04W 24/02 455/525 |
| 2010/0135238 A1 * | 6/2010 | Sadri | ................. | H04W 72/0453 370/329 |
| 2011/0314145 A1 * | 12/2011 | Raleigh | ............... | H04L 41/5054 709/224 |
| 2012/0243638 A1 * | 9/2012 | Maltsev | ............ | H04W 72/0453 375/316 |
| 2014/0071836 A1 * | 3/2014 | Panchal | ............ | H04W 72/1205 370/248 |

(Continued)

*Primary Examiner* — Parth Patel

(57) ABSTRACT

Systems and methods are described for a mesh network of Access Points (APs) and Customer Premises Equipment (CPE) to provide broadband access to premises such as houses or enterprises. Systems and method are described to enable self-configurable CPEs in the sense that the CPEs autonomously find and establish communications with the AP/CPEs from which they receive the strongest signal. Systems and methods are described to enable a self-healing network in the sense that the CPEs autonomously detect low received signal strength or lost connection, and find and establish communications with the AP/CPE from which they receive the strongest signal.

10 Claims, 16 Drawing Sheets

(56) References Cited

U.S. PATENT DOCUMENTS

| | | | |
|---|---|---|---|
| 2014/0148107 A1* | 5/2014 | Maltsev | H04B 1/02 |
| | | | 455/91 |
| 2015/0007238 A1* | 1/2015 | Crouch | H04N 21/21805 |
| | | | 725/93 |
| 2015/0236779 A1* | 8/2015 | Jalali | H04B 7/18508 |
| | | | 342/367 |
| 2016/0353424 A1* | 12/2016 | Stirling-Gallacher | |
| | | | H04B 7/0626 |
| 2017/0005404 A1* | 1/2017 | Berioli | H01Q 3/04 |
| 2017/0187437 A1* | 6/2017 | Cariou | H04B 7/0495 |
| 2017/0195026 A1* | 7/2017 | Ghosh | H04L 1/1685 |
| 2017/0331670 A1* | 11/2017 | Parkvall | H04J 11/0056 |
| 2017/0332292 A1* | 11/2017 | Ponnuswamy | H04L 43/16 |
| 2018/0097560 A1* | 4/2018 | Jalali | H04W 36/0061 |
| 2018/0262363 A1* | 9/2018 | Chamberlain | H04L 12/10 |
| 2019/0007846 A1* | 1/2019 | Lee | H04B 17/318 |
| 2019/0053311 A1* | 2/2019 | Cariou | H04W 72/08 |
| 2019/0090140 A1* | 3/2019 | Bahr | H04L 12/2838 |
| 2019/0140340 A1* | 5/2019 | Ramasamy | H01Q 1/2291 |
| 2019/0215765 A1* | 7/2019 | Ramasamy | H01Q 1/2291 |
| 2019/0222997 A1* | 7/2019 | Reshef | H04W 76/14 |
| 2019/0320409 A1* | 10/2019 | Dvorecki | G01S 5/00 |
| 2019/0327124 A1* | 10/2019 | Lai | G01S 11/02 |
| 2019/0364459 A1* | 11/2019 | Lee | H04L 45/00 |
| 2019/0387435 A1* | 12/2019 | Cariou | H04W 80/02 |

* cited by examiner

SELF-CONFIGURABLE MESH NETWORK FOR WIRELESS BROADBAND ACCESS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present disclosure describes aspects of a system comprising a network of terrestrial Access Points (APs) for wireless broadband internet access to Customer Premises Equipment (CPE) such as those installed at houses and enterprises. The present disclosure describes systems and methods for the design of AP and CPE antenna beams, medium access control protocol, and mesh networking mechanisms to overcome obstructions between the APs and the CPEs.

BACKGROUND OF THE INVENTION

Wireless broadband internet access to Customer Premises Equipment (CPE) such as those installed at houses or enterprises has in recent years gained attention in an effort to provide affordable broadband access. Frequency bands ranging from C band (4 to 6 GHz) to mm-wave frequencies are being considered. Examples of frequency bands of interest are UNI bands in the 5 to 6 GHz range, unlicensed band in the 57 to 71 GHz range, and licensed spectrum in the 20 to 40 GHz range.

The commonly used broadband access to house technologies are coaxial cable, DSL (Digital Subscriber Line), fiber optic cable, and satellite systems. Wireless broadband access systems are receiving increasing attention to provide low cost, high speed and low delay internet access. Installing fiber optic cable to each house can be expensive. An alternative solution to reducing the cost of deploying fiber to each house is wireless access for the so-called last mile from the location of fiber access, sometimes called the headend, to each house. A wireless Access Point (AP) is installed at locations such as on a lamp post or a building in the neighborhood at a location where fiber connection to the internet is available. The high speed backhaul link to the neighborhood may also be provided using wireless links, thereby extending the wireless network beyond the neighborhood to a larger area in a city or a town.

Line of sight (LOS) between the AP and the CPE antennas is desirable to help extend the range of the wireless links. However, in many neighborhoods finding a LOS path from the AP to all CPE premises may not be feasible due to the existence of trees, buildings, hills, or other obstructions. Therefore, systems and methods are needed to overcome obstructions between APs and the CPEs installed at premises. Moreover, in order to provide high data rate to houses/enterprises, systems and methods are needed to minimize interference among the different links in the network. Systems and methods are needed to enable a self-configurable and self-healing network of APs and CPEs to minimize the network operating cost to achieve affordable broadband service.

BRIEF DESCRIPTION OF THE SEVERAL VIEWS OF THE DRAWINGS

Some embodiments of the present invention are illustrated as an example and are not limited by the accompanying figures. In the following figures, where appropriate, similar components are identified using the same reference label.

SUMMARY

Figure 1:
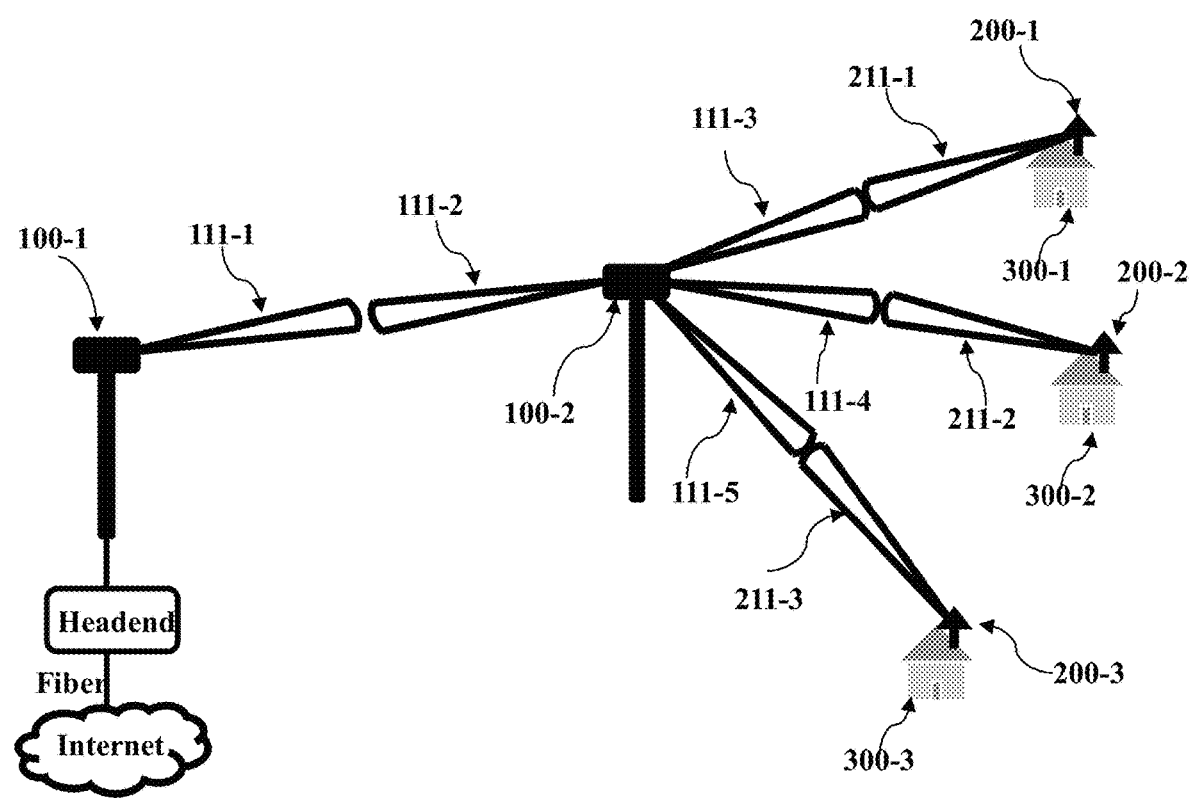
FIG. 1 is a graphical depiction of an exemplary network of Access Points (APs) and Customer Premises Equipment (CPEs) for providing broadband internet access, according to some embodiments.

Systems and methods are described for a network of Access Points (APs) that are connected to the internet and provide broadband access to Customer Premises Equipment (CPE) installed on premises such as houses or enterprises. In some embodiments, the network of APs and CPEs form a mesh architecture, wherein a first CPE relays data from/to a second CPE to/from the internet, the first CPE acting as an AP for the second CPE, the first CPE is said to be in relay-mode and is referred to as a relay-mode-CPE, and the second CPE acting as a client for the first CPE is said to be in client-mode and is referred to as a client-mode-CPE. The system comprising communications equipment, the communications equipment further comprised of at least one radio sub-system, an antenna sub-system comprised of at least one antenna-aperture configured to form at least one beam. The system comprising a plurality of CPEs that each comprise of at least one radio sub-system, and an antenna sub-system comprised of one client-antenna-aperture enabling client-mode of the CPE and at least one relay-antenna-aperture enabling relay-mode of the CPE. There is at least one central controller for a multitude of APs/CEPs. In some embodiments, an AP acts as the central controller.

In some embodiments, the AP/CPE antenna-apertures are capable of electronic beam steering in azimuth and/or elevation. In other embodiments, the antenna-aperture forms a beam that can be steered to any angular position within a predefined angular range, the beam referred to as a steerable beam within the said angular range. In other embodiments, the antenna-aperture forms a beam that can be steered to one of a finite number of angular positions within a predefined angular range, the beam referred to as a switched-beam within the said angular range. In some embodiments, the antenna-aperture is equipped with a mechanical steering mechanism that points the antenna-aperture field of view toward a specific azimuthal angular position within 360 degrees.

In some embodiments, the radio sub-system comprises of an RF transceiver sub-system, a beam forming sub-system, a baseband sub-system, and a processor sub-system. The forward link direction is defined as the data transmission direction from the internet to the APs/CPEs, and reverse link as the data transmission direction from APs/CPE to the internet. Time on the forward link and reverse link is divided into time slots. A reference signal is transmitted by the APs/relay-mode-CPEs on the forward link during certain time slots. The radio sub-system is capable of transmitting a reference signal, receiving reference signals from other APs/CPEs, and estimating the strength of the received reference signals.

CPEs are self-configurable in the sense that they autonomously find and establish communications with the AP/relay-mode-CPE from which they receive the strongest reference signal. Field of view of an antenna-aperture is referred to as the sector covered by the antenna-aperture, in this disclosure. In some embodiments, the azimuthal angular range that covers one sector is further divided into at least one sub-sector, each sub-sector is covered by one antenna-aperture beam, and each AP or relay-mode-CPE antenna-aperture periodically transmits a reference signal on each of the beams covering its sub-sectors, the CPE client-antenna-aperture sequentially points a beam toward each sub-sector within 360 degrees in azimuth, searches for reference signals on each sub-sector, estimates the signal strength of detected reference signals, sends an association request message to the AP/relay-mode-CPE from which it receives the highest reference signal strength, and upon receiving an association acknowledgement message establishes communications with the said AP/relay-mode-CPE. In some embodiments, the client-mode-CPE maintains the position location coordinates of all APs and other CPEs that have already been deployed in the network, client-mode-CPE sequentially points its beam toward the position of each AP/CPE, searches for the reference signal transmitted by each AP/CPE, estimates the reference signal strength received from each AP/CPE, and establishes a communications link with the AP/CPE from which it receives the highest signal strength.

The network is self-healing in the sense that the CPEs autonomously detect low received signal strength or lost connection, and find and establish communications with the AP/relay-mode-CPE from which they receive stronger reference signal. A client-mode-CPE changes its associated AP/relay-mode-CPE as described next. Each AP/relay-mode-CPE forms a beam on each sub-sector of its antenna-apertures and transmits a reference signal on each sub-sector beam of its antenna-apertures. Each client-mode-CPE maintains a list of AP/relay-mode-CPE devices whose reference signals are received with a strength above a threshold, referred to as detectable-RS-list. Each client-mode-CPEs maintains the position location coordinates of all AP/relay-mode-CPE devices in its detectable-RS-list. The client-mode-CPE sequentially points a beam toward the position location of each AP/relay-mode-CPE in its detectable-RS-list, searches for a reference signal from each AP/relay-mode-CPE during a listen-time-interval, estimates received signal strength of the detected reference signals, sends an association message to the AP/relay-mode-CPE from which it receives the highest signal strength, the said AP/relay-mode-CPE responds to the client-mode-CPE with an association acknowledgement message initiating communications with the client-mode-CPE.

In some embodiments, the AP/relay-mode-CPE devices transmit control channels/reference signals on their antenna-aperture sub-sector beams according to a slot-slot-reuse pattern as described next. The time slots allocated to the control channel/reference signal are divided into a number of disjoint sets of time slots, the different sets of time slots are assigned to different sectors/sub-sectors of an AP/CPE such that there is at least one sector/sub-sector separating the sectors/sub-sectors that use the same set of time slots, and the AP/CPE sectors/sub-sector transmit control channel/reference signals during their assigned time slots. In some embodiments, each AP/relay-mode-CPE is assigned a color from a set of colors, colors are assigned to APs/relay-mode-CPEs in the network such that a minimum distance is maintained between APs/relay-mode-CPE devices with the same color, the sub-sectors of the APs/CPs are numbered, the same numbering system is applied to all APs/relay-mode-CPE devices, and the same set of control channel/reference signal time slots are not used in the same sector/sub-sector number of APs/CPEs with different colors.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, as the scope of the invention is best defined by the appended claims. Various inventive features are described below that can each be used independently of one another, or in combination with other features. Broadly, some embodiments of the present invention generally provide a way to communicate among a set of Customer Premises Equipment (CPE) which are installed at houses or enterprises to receive/send data from/to the internet via Access Points (APs).

FIG. 1 illustrates an exemplary terrestrial network comprising APs 100-*j*, CPEs 200-*j*, j an integer index identifying different elements of the same type. AP 100-1 is connected to the internet at the so-called headend location. The headend is typically close to a neighborhood, where there is access to a high-speed internet connection such as fiber optics cable. AP 100-1 may be further connected to a number of other APs to relay/backhaul the data from/to the internet closer to the neighborhood where premises such as houses and enterprises are located. FIG. 1 shows one more AP 100-2 that relays the data from AP 100-1 to be delivered to CPEs 200-1, 200-2 and 200-3. In FIG. 1, APs are illustrated by the solid square shapes, and the CPEs by the solid triangle shapes. APs and CPEs, as will be further described below, are equipped with radio and antenna sub-systems that generate beams to send/receive data to/from other APs and CPEs. The beams generated by the APs are denoted by 111-*j*, and those generated by the CPEs by 211-*j*. In FIG. 1, AP 100-1 points beam 111-1 toward AP 100-2 which in turn points beam 111-2 toward AP 100-1. APs 100-1 and 100-2 communicate via beams 111-1 and 111-2. As another example, AP 100-2 and CPE 200-3 communicate via beams 111-5 and 211-3.

Figure 2:
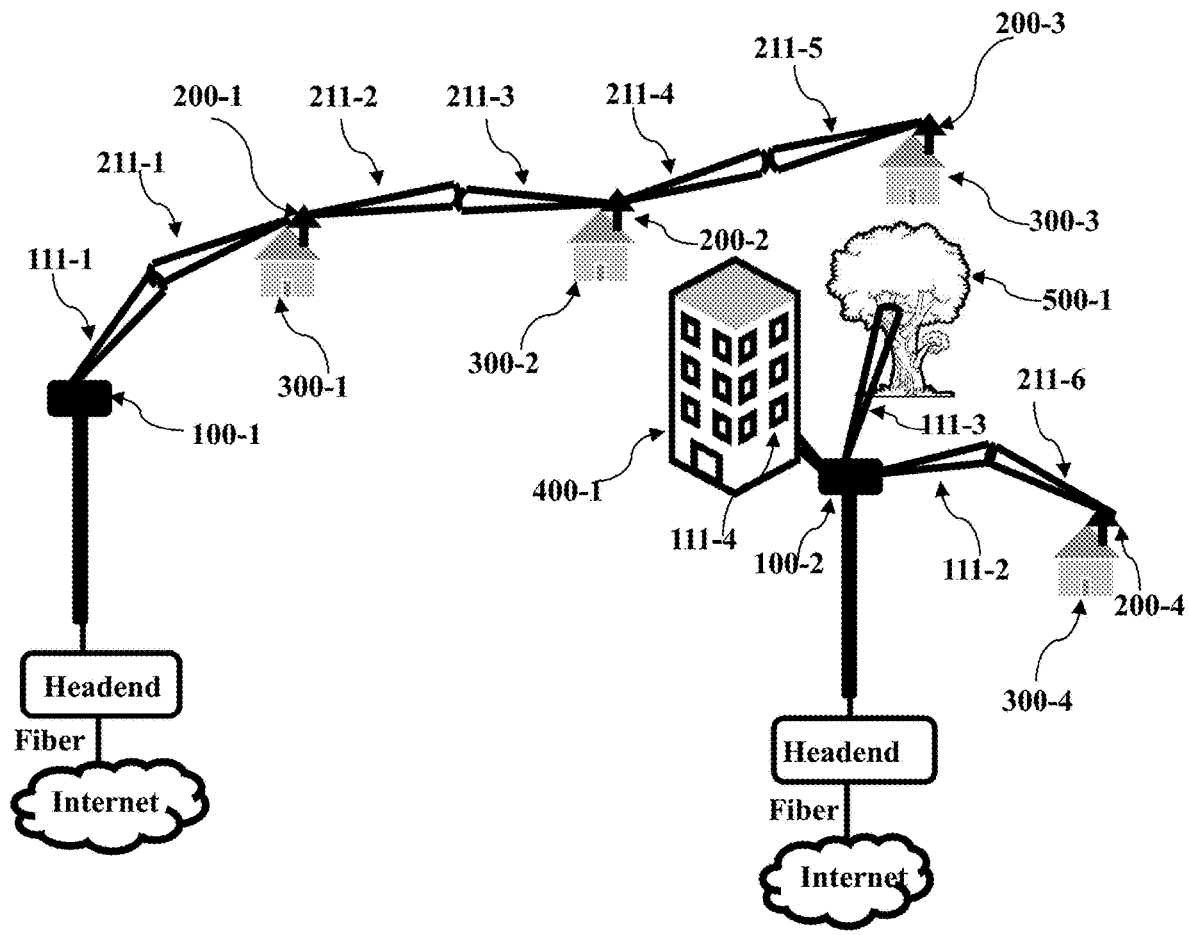
FIG. 2 is a graphical depiction of an exemplary network of APs/CPEs for providing broadband internet access, according to some embodiments.

In the network shown in FIG. 1, CPEs directly communicate with APs. FIG. 2 depicts a mesh network architecture, wherein some CPEs relay data packets received from an AP to other CPEs to deliver the packets to the CPE to which the packet is addressed. In FIG. 2, CPE 200-1 directly communicates with AP 100-1, whereas CPE 200-1 establishes communication links with AP 100-1 and CPE 200-2 and relays the data from/to CPE 200-2 to/from AP 100-1, thereby connecting house 300-2 to the internet. Therefore, in the mesh networking architecture of FIG. 2, a given CPE may be in two different communication modes. In one mode, the CPE receives/sends data from/to the internet via an AP and the said CPE is, in this disclosure, said to be a client-mode-CPE relative to the AP with which the said CPE is communicating, such as when CPE 200-1 is communicating with AP 100-1. In another mode, a first CPE is acting as an AP to a second CPE and relays the data from/to the internet to the second CPE in which case the first CPE is, in this disclosure, referred to as a relay-mode-CPE and the second CPE as the client-mode-CPE. For instance, in FIG. 2, CPE 200-1 which connects CPE 200-2 to the internet via AP 100-1 is said to be a relay-mode-CPE relative to CPE 200-1, and CPE 200-2 which uses CPE 200-1 to reach AP 100-1 is said to be a client-mode-CPE relative to CPE 200-1.

The benefits of mesh networking are illustrated in FIG. 2, as described next. The propagation loss between two devices is due, primarily, to free space path loss and to any obstructions in the path between the APs/CPEs. CPE 200-1 in FIG. 2 is said to have a Line of Sight (LOS) to AP 100-1 because there are no buildings, trees or other obstructions between the said devices. In LOS conditions, a client-mode-CPE would communicate with the AP or the relay-mode-CPE to which the client-mode-CPE is closest, and therefore has the smallest propagation loss. However, when there is an obstruction between a client-mode-CPE and its closest relay-mode-CPE or AP, the client-mode-CPE may have smaller overall propagation loss to a relay-mode-CPE or an AP that is father, in which case the client-mode-CPE communicates with the farther relay-mode-CPE or AP. For instance, house 300-2, in FIG. 2, is physically closer to AP 100-2, but building 400-1 obstructs the path between AP 100-2 and CPE 200-2 installed on house 300-2, in which case CPE 200-2 has a smaller propagation loss toward CPE 200-1 and uses CPE 200-1 to reach the internet. Similarly, house 300-3 uses the path through CPE 200-2 to reach the internet instead of communicating with AP 100-2 because of the tree obstruction between CPE 200-3 and its closest AP 100-2.

AP and CPE Equipment Sub-Systems

Figure 3A:
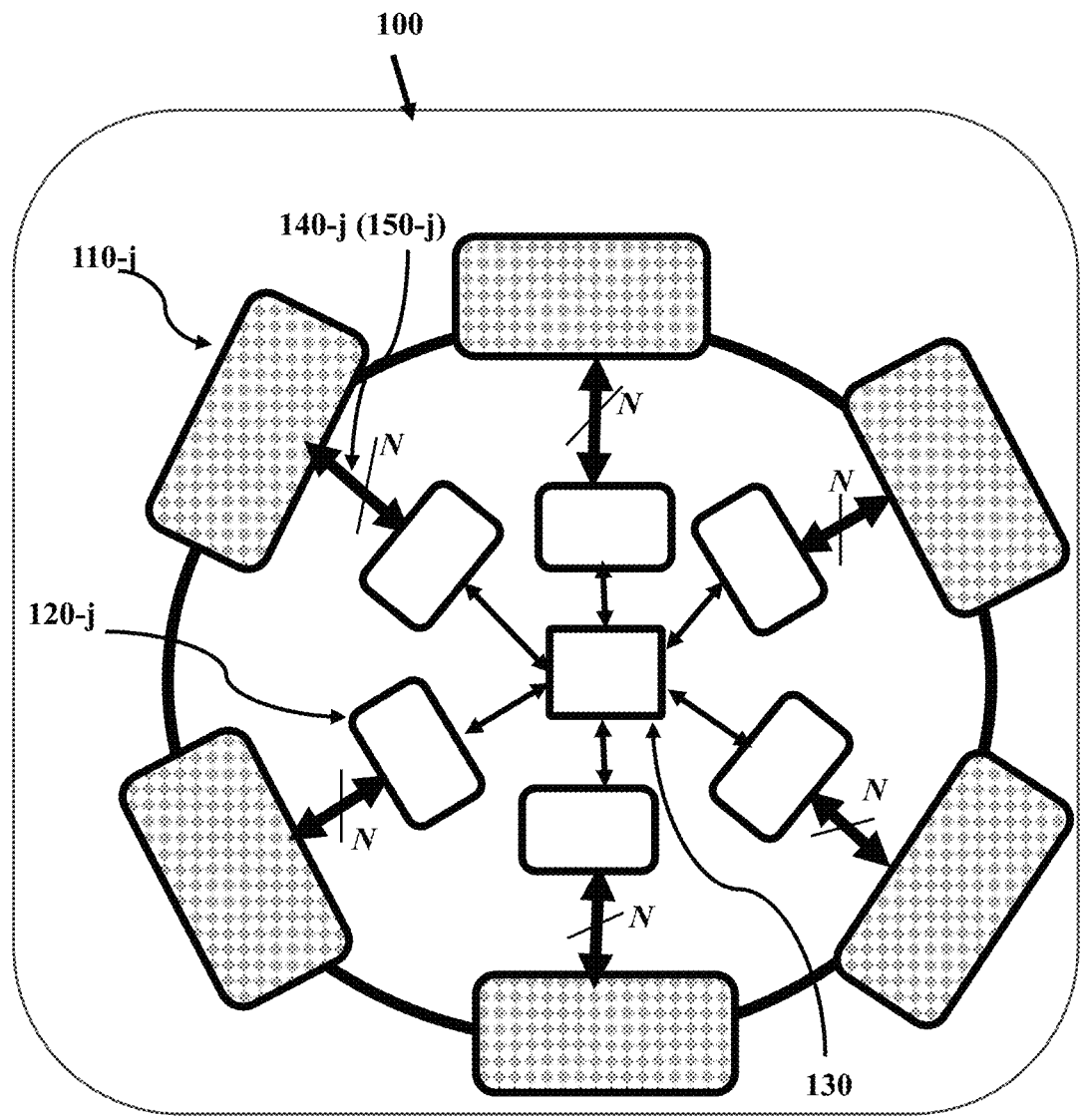
FIG. 3A is a graphical depiction of an exemplary architecture of AP/CPE equipment, according to some embodiments.

FIG. 3A illustrates one exemplary embodiment of the AP equipment 100-*k*, k is an integer index identifying different instances of equipment of the same type. The AP equipment 100-*k* comprises of four main sub-systems: the antenna-aperture 110-*k*; the radio sub-system 120-*k*; the router sub-system 130; and the interface 140 (150) which connects the radio sub-system to the antenna sub-system, where label 140 signifies analog (RF) interface and 150 a baseband (digital) interface. The combination of the backslash symbol and letter N in FIG. 3A imply that the interface 140 (150) comprises of N identical interfaces, each carrying a different signal of the same type. The choice of RF or digital interface between the radio sub-system and the antenna sub-system depends on the division of functionality between the radio and antenna sub-systems, as will be further described below.

Figure 3B:
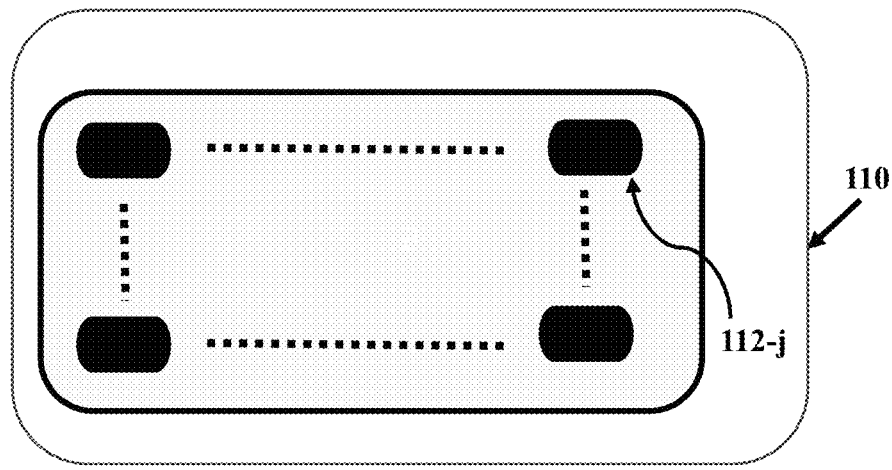
FIG. 3B is a graphical depiction of an exemplary antenna-aperture design, according to some embodiments.

Each antenna-aperture 110-*k* generates beams that point to other APs or CPEs to establish communications links. For instance, if there are six antenna-apertures, each antenna-aperture provides coverage to APs/CPEs within a 60-degree angular area in azimuth, thereby the six antenna-apertures cover 360 degrees in azimuth. The exemplary antenna-aperture 110-*k* depicted in FIG. 3B is a panel antenna comprised of a number of antenna-elements 112-*j*. In one embodiment, each antenna-aperture comprises of N antenna-elements, interface 140 connects N analog RF signals to the antenna-aperture, one RF signal to each antenna-element. In another embodiment, each antenna-aperture comprises of N antenna-elements, interface 150 connects N digital baseband signals to the antenna-aperture, one digital baseband signal to each antenna-element, the antenna-element 112-*j* is further comprised of circuitry that up-bands the digital signal to the RF frequency, amplifies the RF signal and applies the resulting RF signal to the said antenna-element. Examples of antenna-elements are dipole, patch, conical, and horn.

A sector is, in this disclosure, defined as the range of azimuthal and elevation angles of the field of view of the antenna-aperture toward which the said antenna-aperture forms and steers beams. The signals that are applied to the different elements 112-*j* of the antenna-aperture 110-*k* are phased in such a way as to electronically shape the antenna-aperture beam into a desired pattern, and to point the peak of the beam in azimuth and in elevation toward a certain angular direction within the sector.

Figure 3C:
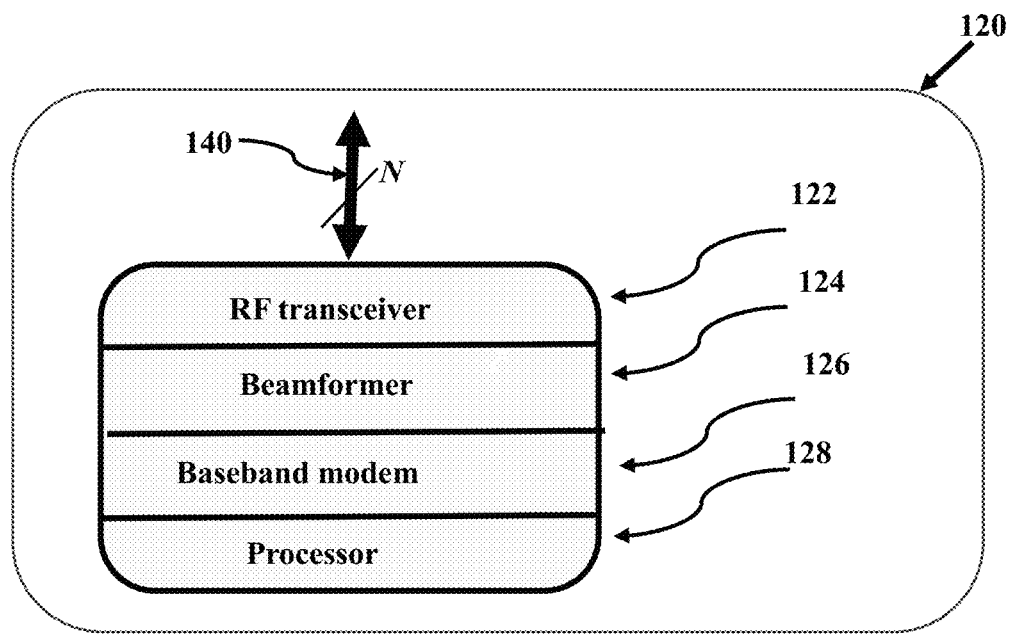
FIG. 3C is a graphical depiction of an exemplary radio sub-system architecture, according to some embodiments.

In one embodiment, an exemplary AP equipment radio sub-system 120-*k*, as depicted in FIG. 3C, comprises: an RF transceiver 122-*k* that converts the baseband signal to the RF frequency of operation and sends the N analog RF signals to the N antenna-elements of the antenna sub-system via interface 140; a beamformer sub-system 124-*k* that determines the phases that need to be applied to signals destined to each antenna-element, to generate the beams for each sector; a baseband sub-system 126-*k* that carries out baseband signal processing functions such as error correction encoding, modulation, demodulation, and decoding; and a processor sub-system 128-*k* to implement functions such as upper layer protocols, assignment of radio resources such as AP beams, carrier frequencies and time slots on each carrier frequency, and sector beam management.

Figure 3D:
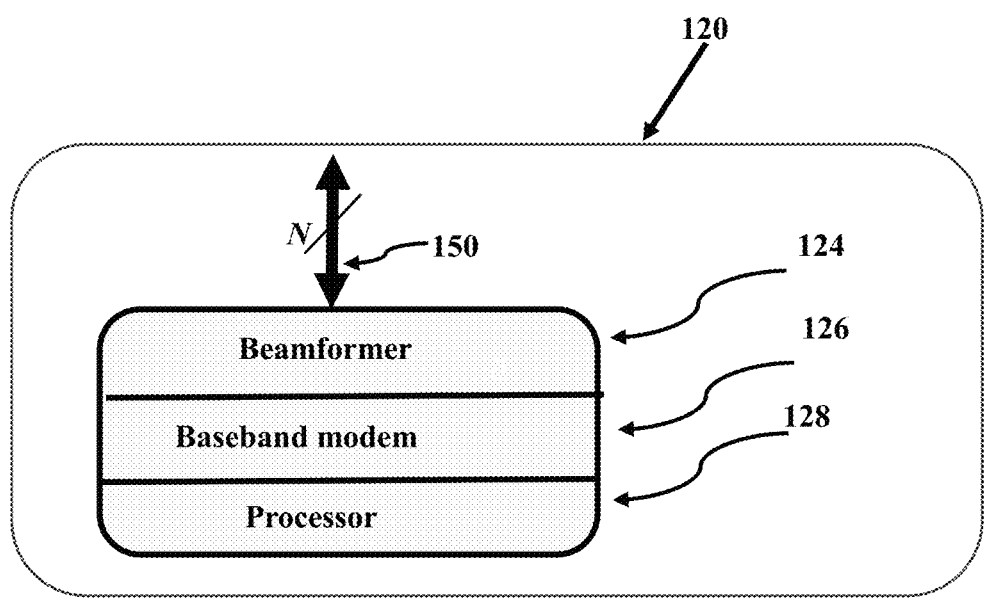
FIG. 3D is a graphical depiction of an exemplary radio sub-system architecture, according to some embodiments.

In another embodiment, FIG. 3D depicts an exemplary radio sub-system, the radio sub-system 120-*k* comprises of the beamformer sub-system 124-*k* which sends the N digital baseband signals to the N elements of antenna sub-system via interface 150, baseband sub-system 126-*k*, and processor sub-system 128-*k*, in which case the RF transceiver sub-system 122-*k* is included in the antenna sub-system 110-*k*. In a variation of the embodiment, the radio sub-system also comprises a position location determination sub-system, such as GPS (Global Positioning System) receiver.

The network of APs/CPEs has a central controller entity which carries out functions such as sending system parameter messages to APs/CPEs, sending configuration messages to APs/CPEs, requesting that a client-mode-CPE connect to a certain AP/relay-mode-CPE, and scheduling time slots to APs/relay-mode-CPEs on which to transmit to their client-mode-CPEs. In one embodiment, an AP is assigned as the central controller for a group of APs/CPEs, and the processor sub-system of the central controller AP is configured to carry out central controller functions for the group of APs/CPEs.

Figure 5:
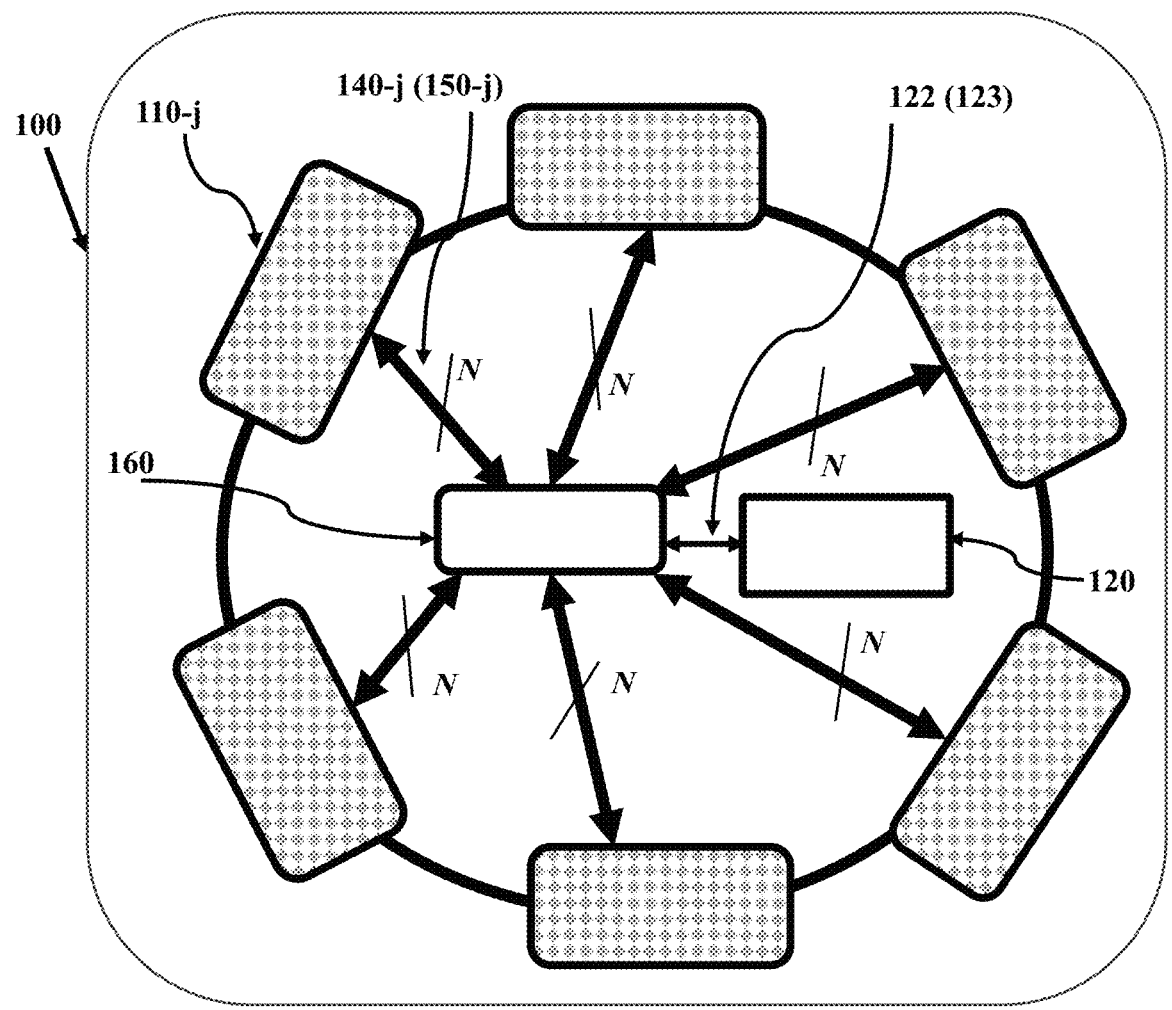
FIG. 5 is a graphical depiction of an exemplary architecture of AP/CPE equipment, according to some embodiments.

As shown in FIG. 3A, each antenna-aperture 110 has a dedicated radio sub-system 120. Data packets destined to the CPEs within the coverage area of a sector are forwarded by the router sub-system 130 to the radio sub-system corresponding to the antenna-aperture that provides coverage to the said sector. FIG. 5 depicts another AP equipment architecture, wherein one radio sub-system 120 is shared by all antenna-apertures 110-*k* in a time division manner. The switching sub-system 160 switches the radio sub-system 120 among antenna-apertures according to a scheduling scheme. In one embodiment, interface 140-*j* between the switching sub-system 160 and antenna-apertures 110-*j*, and interface 122 between the radio sub-system 120 and switching sub-system 160, are analog, wherein the radio sub-system 120 sends analog RF signals to sub-system 160 which in turn sends the said signals to one of the antenna-apertures. In another embodiment, interfaces 150-*j* and 123 are digital, digital baseband signals are sent to the antenna-elements, and the up-banding to the RF frequency is carried out by the circuitry included in the antenna-elements. The equipment architecture of FIG. 3A, the antenna-aperture of FIG. 3B, and the radio sub-system of FIGS. 3C and 3D, described in the context of APs, are also applicable to the corresponding sub-systems of the CPEs.

Figure 4A:
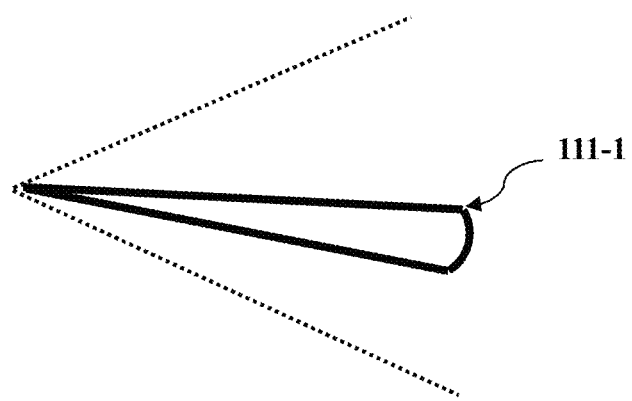
FIG. 4A is a graphical depiction of an exemplary AP/CPE beam within a sector, according to some embodiments.
Figure 4B:
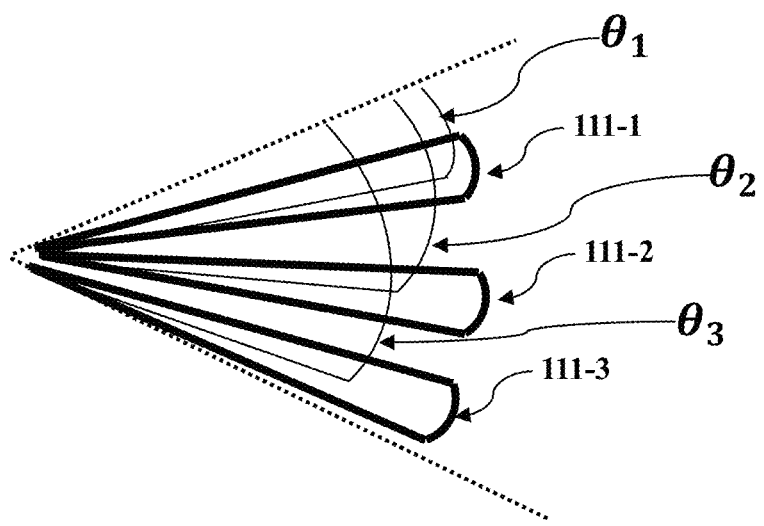
FIG. 4B is a graphical depiction of an example of multiple AP/CPE beams in a sector, according to some embodiments.
Figure 4C:
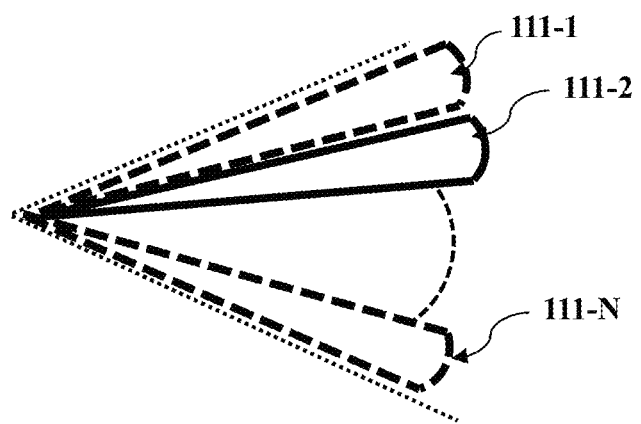
FIG. 4C is a graphical depiction of an exemplary set of AP/CPE beams covering a sector, according to some embodiments.
Figure 4D:
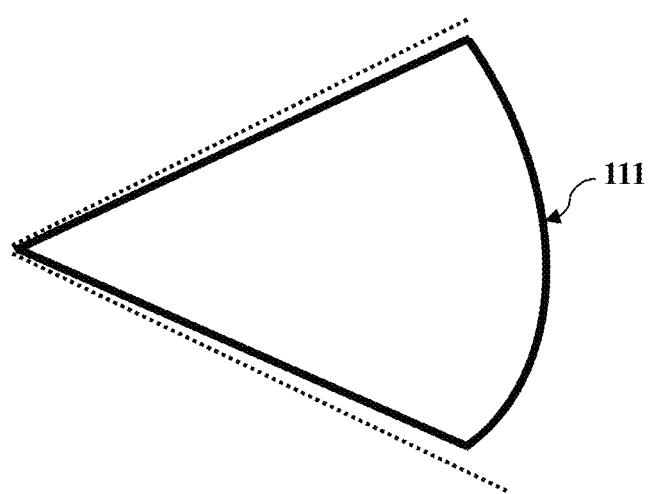
FIG. 4D is a graphical depiction of an exemplary sector-wide beam, according to some embodiments.

In one embodiment, the beamwidth of the antenna-aperture beams formed by an AP/CPE toward another AP/CPE is narrower than the angular range of a sector, in order to increase the antenna-gain and the achieved data rate. FIG. 4A illustrates a beam 111, shown by the solid triangular shape, that is narrower than the azimuthal angular range covered by the sector, the sector delineated by the dashed lines. The narrow antenna beam of a first AP/CPE is steered by the antenna sub-system toward a second AP/CPE with which the first AP/CPE communicates. FIG. 4A only illustrates one steered beam. In another embodiment, there are multiple simultaneous steered beams within a sector communicating with different CPEs. FIG. 4B illustrates the case of 3 steered beams, whose boresights are at azimuthal angles $\theta_1$, $\theta_2$, and $\theta_3$ relative to the upper edge of the sector. In another embodiment, the sector is divided into M sub-sectors, the antenna-aperture is capable of forming M fixed beams, each beam covers one sub-sector as illustrated by FIG. 4C, where M fixed beams 111-1 to 111-M cover the azimuthal angular range of one sector; the beam which provides the highest gain toward a second CPE, beam 111-2 in FIG. 4C shown by solid line triangular shape, is used to communicate with the second CPE, and the remaining fixed beams are inactive (off) shown by dotted line triangular shapes. In another embodiment, M fixed beams are formed that cover a sector and multiple of the fixed beams are active, each communicating with a different CPE. In another embodiment, as illustrated by FIG. 4D, one sector-wide beam 111 covers the whole sector.

FIG. 5 shows only one radio sub-system 120 being shared among 6 antenna-apertures 110-*j*. However, a person of ordinary skill in the art will readily recognize that the radio sub-system may be shared by a number of antenna-apertures other than 6, and a number of radio sub-systems other than 1 may be shared by the antenna-apertures, without departing from the scope of the disclosure. Furthermore, the system depicted in FIG. 3A comprises of 6 antenna-apertures and 6 audio sub-systems. A person with ordinary skills in the art will readily recognize that a number of antennas and radio sub-systems other than 6 may be used by the AP, without departing from the scope of the disclosure.

A person of ordinary skill in the art will readily recognize that the exemplary AP equipment architecture of FIG. 3A and the exemplary radio sub-system components illustrated in FIGS. 3C and 3D are meant to facilitate description of the forthcoming embodiments, that the functional components of the AP equipment and the radio sub-system may be organized differently than those of FIGS. 3A, 3C and 3D, and that other architectures and functional organizations may be used, without departing from the scope of this disclosure. For instance, the router sub-system functionality in FIG. 3A may be included in the radio sub-system, and beamforming sub-system of FIGS. 3C and 3D may be included in the baseband sub-systems.

Timing Synchronization

As mentioned previously, the data transmission direction from the internet to the APs/CPEs is, in this disclosure, referred to as the forward link, and the direction from APs/CPEs to the internet as the reverse link. A system, wherein the APs and CPEs transmit and receive data on the same carrier frequency but in alternating time intervals, is referred to as a Time Division Duplex (TDD) multiple access system. A system, wherein the APs and CPEs transmit and receive data on different carrier frequencies, is referred to as a Frequency Division Duplex (FDD) multiple access system. In an exemplary TDD system, time is divided into frames, each frame is further divided into two sub-frames where one sub-frame is used to transmit data in the forward direction and the second sub-frame is used to transmit data in the reverse direction. Each sub-frame is further divided into smaller units of time, referred to as time slots. In an FDD system, the forward link and reverse link frames are simultaneously transmitted on different carrier frequencies.

In an embodiment of a TDD system, all CPEs and APs are synchronized, the network of APs and CPEs are grouped into odd and even numbered layers, all radio sub-systems of the same AP/CPEs transmit or receive simultaneously on the same carrier frequency, the AP/CPEs of the odd numbered layers transmit during the same time slots, the APs/CPEs of the even numbered layers transmit the same time slots, and when the APs/CPEs in odd numbered layers are transmitting on a carrier frequency the APs/CPEs of the even numbered layers are receiving on the same carrier frequency and vice versa. In one embodiment of a TDD system, the amount of time allocated to the forward and reverse links is equal, wherein 50% of the time the radio sub-systems of a CPE are transmitting and 50% of the time they are receiving. In one embodiment of an FDD system, the network of APs and CPEs are grouped into odd and even numbered layers, all radio sub-systems of the AP/CPEs of odd layers simultaneously transmit on carrier frequency F1 and receive on carrier frequency F2, all radio sub-systems of the AP/CPEs of even layers simultaneously transmit on carrier frequency F2 and receive on carrier frequency F1.

Figure 6:
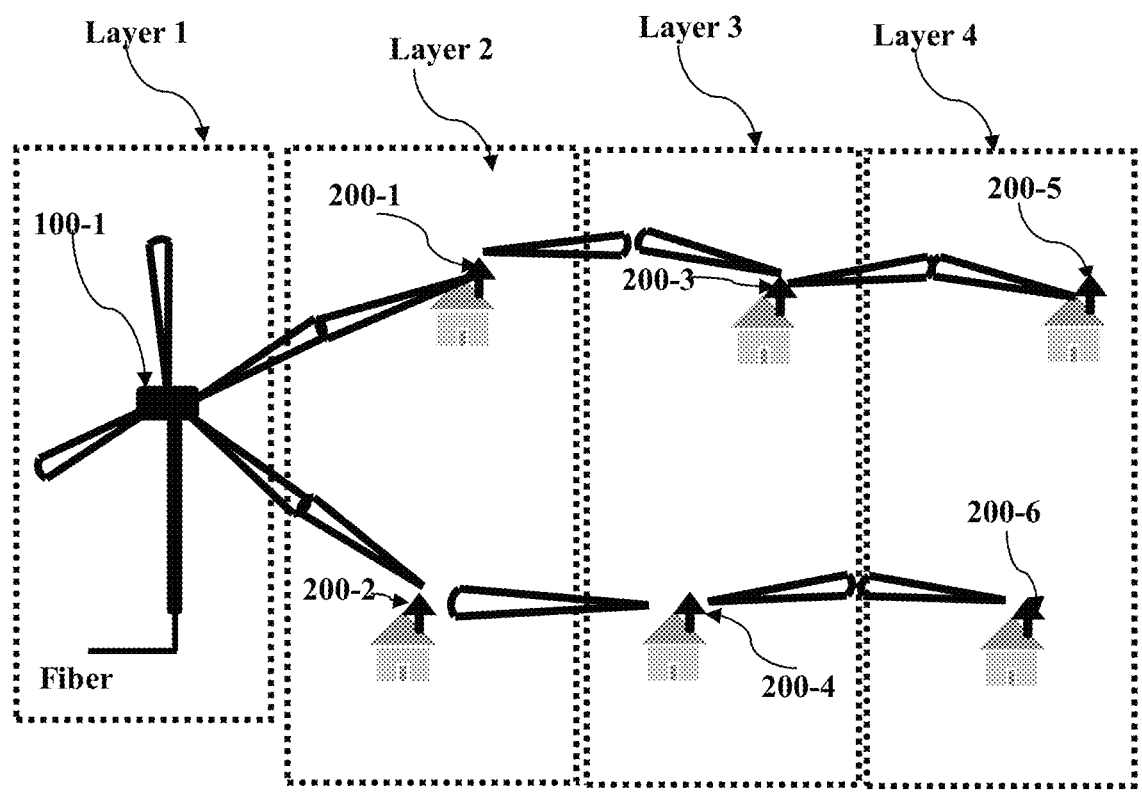
FIG. 6 is a graphical depiction of an exemplary network of APs and CPEs for providing broadband internet access to CPEs, according to some embodiments.

FIG. 6 depicts a network where AP/CPEs are divided into 4 layers. Each CPE reaches the internet via a path comprised of links between APs/CPEs in adjacent layers, wherein each CPE in a given layer communicates with a CPE in the previous layer until the path reaches an AP that is connected to the internet. Dotted rectangular boxes enclose the APs and CPEs that belong to the same layer. In a TDD system, if the APs and CPEs in layers 1 and 3 are transmitting and the APs/CPEs in layers 2 and 4 are receiving on the same carrier frequency, then radio transmitters of a CPE in each layer are all either transmitting or receiving in a given time slot, and there is no cross-antenna-aperture interference from one antenna-aperture of a CPE to another antenna-aperture of the same CPE. In the example of FIG. 6, CPE 200-5 reaches the internet via CPEs 200-3 and 200-1 and AP 100-1.

In another embodiment of a TDD system, the transmit/receive phases of the different APs and CPEs in the network operate in an asynchronous fashion, the transmit/receive phases of the different antenna-apertures of the same AP/CPE operate in a synchronized fashion. In one embodiment, each AP or CPE transmits or receives regardless of the transmit/receive state of the other APs/CPEs in the network, and when one antenna-aperture of an AP/CPE is transmitting during a time slot on a given carrier frequency the adjacent antenna-apertures of the same AP/CPE are not receiving on the same carrier frequency.

In another embodiment of a TDD system, the different APs and CPEs in the network and the different antenna-apertures of the same AP/CPE operate in an asynchronous fashion, wherein each antenna-aperture of an AP or CPE transmits or receives regardless of the transmit/receive state of other antenna-apertures of the same AP/CPE or of the other APs/CPEs. Then, a first antenna-aperture of an AP/CPE may be transmitting while a second antenna-aperture adjacent to the first antenna-aperture of the same AP/CPE may be receiving from a different AP/CPE. In this scenario, if two adjacent antenna-apertures of an AP/CPE are operating on the same carrier frequency, then the receiving antenna-aperture of the AP/CPE may receive excessive amount of interference from the transmitting antenna-aperture of the same AP/CPE. In one embodiment, a different carrier frequency is used by the adjacent antenna-apertures in order to reduce interference received from adjacent antenna-apertures. In another embodiment, the adjacent antenna-apertures use a different antenna polarization to reduce cross-antenna-aperture interference.

In one embodiment, there are at least two antenna-apertures, the antenna-apertures are divided into two groups, wherein the first group are placed above the second group in the AP/CPE architecture. The sectors are divided into two groups, antenna-apertures in the first group cover the first group of sectors, the antenna-apertures in the second group cover the second group of sectors. In one embodiment, the AP/CPE comprises of four antenna-apertures, each aperture covering one of the four sectors, two of the antenna-apertures are placed in the first row, facing different directions forming beams over odd numbered sectors, the other two antenna-apertures are placed in the second row of antenna-apertures above the first row of antenna-apertures, facing different directions forming beams over even numbered sectors. In the two-row antenna-aperture placement design, there is additional isolation between the transmit and receive of the apertures in the two groups due to the distance between the two sets of apertures resulting in additional path loss, which reduces cross-antenna-aperture interference. Then, the signal transmitted by one aperture will be attenuated by the sidelobe rolloff of the transmit beam, the sidelobe rolloff of the receive beam, and the path loss between the two apertures. Additional isolation between transmitter in one group and the receiver in the second group of apertures may also be achieved by using different antenna polarizations in the two groups.

Beam Types and Beam Steering

The boresight of a beam refers to the azimuthal and elevation angles toward which the peak of the beam points. As was previously defined, a sector is, in this disclosure, defined as the range of azimuthal and elevation field of view of the antenna-aperture toward which the said antenna-aperture forms and steers beams. An antenna-aperture beam that is steerable to any azimuthal angle within the antenna-aperture's sector is, in this disclosure, said to be steerable in azimuth. Similarly, a beam that is steerable to any elevation angle within the sector is said to be steerable in elevation. A beam whose boresight may be placed in one of a finite number of azimuthal angular positions within a sector is, in this disclosure, said to be switched-beam in azimuth. Similarly, a beam whose boresight may be placed in one of a finite number of elevation angular positions is said to be switched-beam in elevation. An antenna-aperture beam whose boresight is placed at a fixed azimuthal angle is, in this disclosure, said to be fixed-beam in azimuth, and similarly for an antenna-aperture beam fixed in an elevation angle. As described in the forthcoming embodiments in this disclosure, an antenna-aperture may create a beam that is steerable in one angular direction and switched-beam or fixed-beam in another angular direction. For instance, the beam that can take any beam positions in azimuth but only one of a finite number of beam positions in elevation is, in this disclosure, said to be steerable in azimuth and switched-beam in elevation.

Figure 7A:
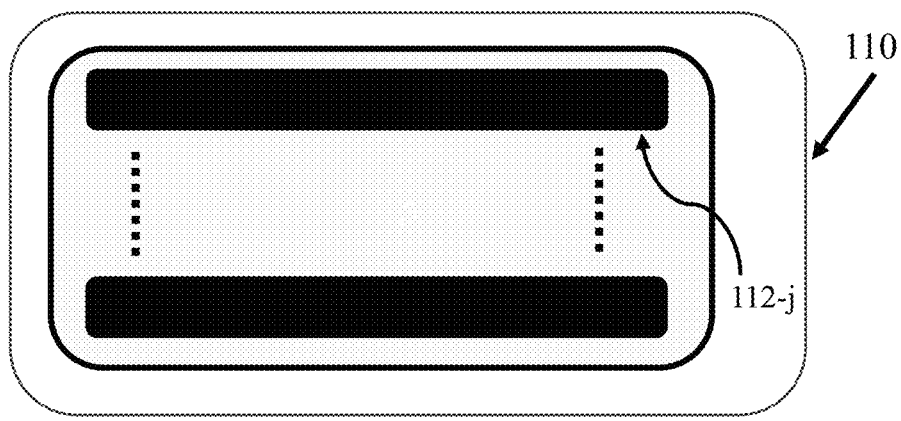
FIG. 7A is a graphical depiction of an exemplary antenna-aperture design, according to some embodiments.

In one embodiment, the antenna-aperture, as illustrated by FIG. 3B, comprises of rows and columns of antenna-elements. An exemplary mathematical depiction of the signal, $S_{kl}(t)$, applied at time t to the antenna-element in the k-th row and l-th column, is given by $$S_{kl}(t) = Re(B(t)\alpha_k\beta_l e^{j(\theta_k + \varphi_l)} e^{j2\pi ft}) \qquad (1)$$

where Re denotes real part, $\alpha_k\beta_l$ is the gain applied to the signal for the antenna-element in the k-th row and l-th column, $\theta_k + \varphi_l$ is the phase applied to the said signal, f is the carrier frequency, B(t) is the baseband constellation symbol which is a complex number and carries the encode data information, t denotes time, and j denotes imaginary component of the number. The gain and phases applied to the antenna-elements are, in the exemplary mathematical description (1), separated into two components, 420 corresponding to the row and column position of the element in order to facilitate description of different antenna-aperture designs in the forthcoming embodiments. In one embodiment, the antenna-aperture, as illustrated in FIG. 7A, comprises of a row of antenna-elements 112-k. An exemplary mathematical depiction of the signal applied to the antenna-element in each row is, based on the terminology defined above, given by $$S_k(t)=Re(B(t)\alpha_k e^{j\theta_k}e^{j2\pi ft}) \quad (2)$$

where the gain and phase of the signal is only a function of the k-th row of the antenna-aperture. A person of ordinary skill in the art will readily recognize that the exemplary mathematical depictions of equations (1) and (2) are meant to facilitate description of the forthcoming embodiments, and that other mathematical depictions may be used, without departing from the scope of this disclosure.

Figure 7B:
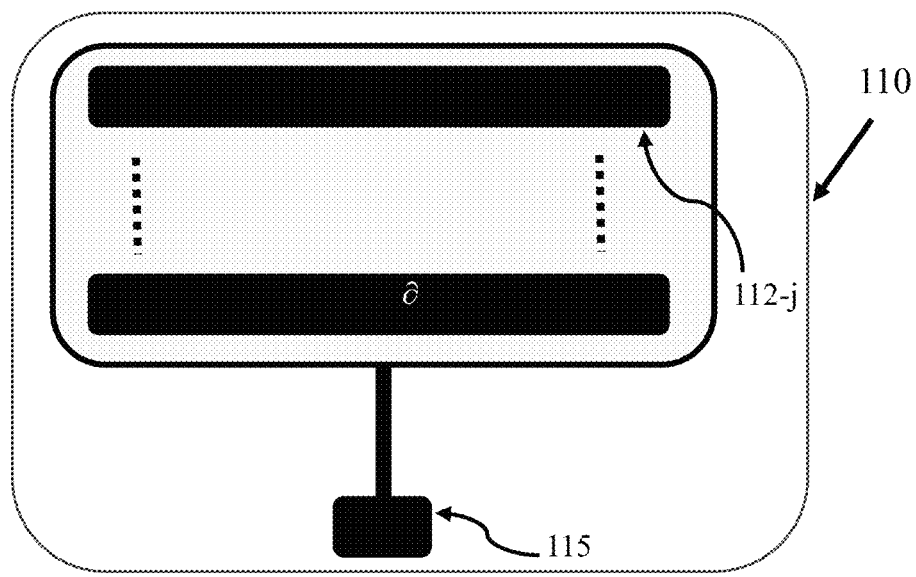
FIG. 7B is a graphical depiction of an exemplary antenna-aperture design, according to some embodiments.

In one embodiment, as illustrated in FIG. 7A, the antenna-elements 112-$k$ have larger width, therefore narrower beamwidth in azimuthal direction than in the elevation. In one embodiment, gains and phases are applied to the signals of the antenna-elements of FIG. 7A such that the formed beam is steerable in elevation angular direction but fixed-beam in azimuthal angular direction. Equation (2) is an exemplary mathematical description of the signals applied to the antenna-elements in row k of the antenna-aperture in FIG. 7A. In another variation of the embodiment, illustrated in FIG. 7B, the antenna-aperture is further equipped with a mechanical steering device 115 that is capable of moving the beam in azimuth or in elevation, wherein in azimuth the beam is steered using the mechanical steering mechanism, and in elevation the beam is steered by adjusting the gains and phases applied to the antenna-elements or by using the mechanical steering mechanism.

Figure 7C:
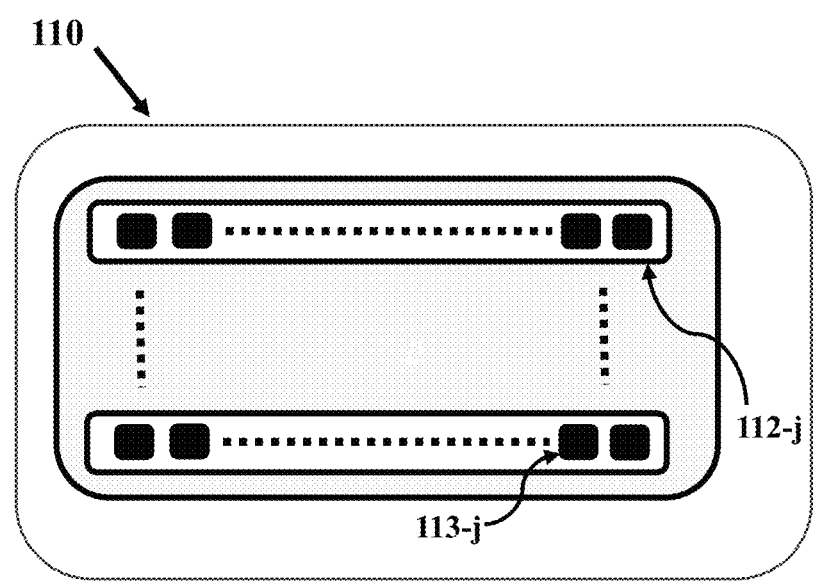
FIG. 7C is a graphical depiction of an exemplary antenna-aperture design, according to some embodiments.

In another embodiment, as illustrated in FIG. 7C, the antenna-elements 112-$k$ are further comprised of sub-elements 113-1, l an integer index identifying different components of the same type, there are K rows and L sub-elements in each row for a total of N=K×L sub-elements. In one embodiment, one radio transceiver is interfaced to each sub-element, each transceiver applies an RF signal to the antenna sub-element interfaced to the said transceiver, and the gains and phases of the signals applied to each sub-element are such as to form a steerable beam in azimuth. In another embodiment, the beam is steerable in elevation. Equation (1) depicts an exemplary mathematical description of the signals applied to the sub-elements in row k and column 1 of the antenna-aperture in FIG. 7C. In another embodiment, the gains and phases applied to the different antenna sub-elements are chosen such as to form a beam that is switched-beam in azimuth. In another embodiment, the beam is switched-beam in elevation. In another embodiment, one transceiver is interfaced to each row of sub-elements for a total of K transceivers, each transceiver provides one analog RF signal to the row of sub-elements, the RF signal applied to each row of sub-elements is further split into L RF signals, and the phase and gain of each of the said L analog RF signals in each row is further modified such as to steer a beam toward an azimuthal angular direction. In a variation of the embodiment, one signal is applied to each row of antenna sub-elements using one radio transceiver per row of sub-elements, multiple feeding networks are designed into each row of the antenna sub-elements, each feeding network is designed to form one beam position in azimuth, and the radio sub-system enables one of the beam positions by instructing the antenna sub-system to choose the feeding network corresponding to the said beam position. In another variation of the embodiment, a mechanical steering mechanism is also used to steer the beam in azimuth or elevation.

In another embodiment, each antenna-element comprises of two polarizations, the antenna-apertures create two beams with different polarizations, the radio sub-systems send a different data stream on each antenna polarization, thereby transmitting/receiving two different data streams, one on each antenna polarization.

Signal strength is synonymous with signal power, in this disclosure. An exemplary mathematical description of the received signal strength (power), $P_{rx}$, is given by $$P_{rx}=P_{tx}G_{tx}(\theta_{az},\theta_{el})G_{rx}(\varphi_{az},\theta_{el})L(d), \quad (3)$$

where $P_{rx}$ is the received signal power at the receiver, $P_{tx}$ is the transmit power into the transmitter antenna, $\theta_{az}$ and $\theta_{el}$ are the azimuthal and elevation angles from transmitter toward the receiver with respect to the pointing direction of the transmit antenna beam boresight and $G_{tx}(\theta_{az}, \theta_{el})$ is the transmit antenna beam gain toward the receiver at the said angles, $\varphi_{az}$ and $\varphi_{el}$ are the azimuthal and elevation angles from the receiver toward the transmitter with respect to the pointing direction of the receive antenna beam boresight and $G_{rx}(\varphi_{az}, \varphi_{el})$ is the receiver antenna beam gain toward the transmitter at the said angles, d is the distance between the transmitter and receiver, and L(d) is the propagation path loss between the transmitter and receiver. When the transmitter antenna and the receiver antenna beam boresights are pointing to each other, angles are 0 and the antenna gains in equation (3) are the boresights gain of the antennas.

One example of received signal quality metric is SINR (Signal to Noise plus Interference Ratio), where signal refers to the received signal strength (power) from the signal that is intended for the receiver under consideration, and interference is the sum of all received signal powers from signals that are not intended for the receiver under consideration. The received signal powers in computing the SINR are computed according to (3) for all interfering transmitters. SINR is then the ratio of the intended signal received power to the sum of received powers of unintended signals and the thermal noise power. A person of ordinary skill in the art will readily recognize that other mathematical representations of received signal than (3) and signal quality metrics other than SINR may be used in describing the embodiments in this disclosure, without departing from the scope of the disclosure.

In one embodiment, the antenna beam of a first AP/CPE toward a second AP/CPE is switched-beam, the first CPE radio sub-system instructs its antenna-aperture to switch its beam to different beam positions, the second AP/CPE transmits a reference signal in the sector where the first AP/CPE is located, the first AP/CPE radio sub-system measures the received signal strength at the different beam positions and chooses the beam position with the highest reference signal strength to transmit/receive to/from the second AP/CPE. In another embodiment, the antenna beam of a first AP/CPE toward a second AP/CPE is switched-beam, the radio sub-system of the first AP/CPE knows position location coordinates of the second AP/CPE, the first AP/CPE radio sub-system instructs its antenna-aperture to switch its beam to the beam position whose boresight is closest to the angular position within the sector where the second AP/CPE is located and transmits/receives to/from the second AP/CPE at the said beam position.

In another embodiment, the antenna beam of a first AP/CPE toward a second AP/CPE is steerable, the first AP/CPE radio sub-system iterates its beam's angular position within its sector according to: a first AP/CPE points its beam toward an angular position within the sector referred to as the current AP/CPE beam position on which it transmits/receives data, the second AP/CPE transmits a reference signal in the sector where the first AP/CPE is located, the first AP/CPE radio sub-system measures the received signal strength at the current beam position and stores the measured signal strength, the first AP/CPE radio sub-system instructs its AP/CPE antenna-aperture to steer its beam to a new beam position, the first AP/CPE radio sub-system measures the received signal strength at the new beam position, and if the measured signal strength at the new beam position is higher than that of the current beam position then the new beam position is used as the current beam position. In another embodiment, the antenna beam of a first AP/CPE toward a second AP/CPE is steerable, the first AP/CPE radio sub-system knows the position coordinates of the second AP/CPE, the first AP/CPE radio sub-system instructs its antenna-aperture to steer its beam's boresight toward the angular position within the sector where the second AP/CPE is located, and transmit/receive data to/from the second AP/CPE at the said beam position.

In another embodiment, the first AP/CPE has a fixed-beam, knows the position location coordinates of the second AP/CPE, the first AP/CPE points its beam toward the angular position within the sector where the second AP/CPE is located. In another embodiment, the antenna beam of a first AP/CPE is a fixed-beam, the first AP/CPE radio sub-system iterates the angular position within the sector where it points its beam according to: the first AP/CPE uses a mechanical steering mechanism to point its beam toward an angular position within the sector referred to as the current AP/CPE beam position, the second AP/CPE transmits a signal in the sector where the first AP/CPE is located, the first AP/CPE radio sub-system measures the received signal strength at the current beam position and stores the measured signal strength, the first AP/CPE radio sub-system instructs its antenna-aperture to use the mechanical steering mechanism to point its beam to a new beam position, the first AP/CPE radio sub-system measures the received signal strength at the new beam position, and if the measured signal strength at the new beam position is higher than that of the current beam position then the new beam position is chosen as the current beam position.

AP/CPE Antenna Sub-System

In one embodiment, the AP comprises of at least one antenna-aperture, the antenna-aperture comprised of antenna-elements, the antenna-aperture forming at least one beam that is steerable in azimuth. In a variation of the embodiment, the beam is steerable in elevation direction. In another embodiment, the AP comprises of at least one antenna-aperture, the antenna-aperture comprised of antenna-elements, the antenna-aperture forming at least one beam that is switched-beam in elevation. In a variation of the embodiment, the beam is switched-beam in azimuth.

In one embodiment, a CPE is comprised of at least one antenna-aperture that forms a beam that is steerable in azimuth. In another embodiment, the CPE is comprised of at least one antenna-aperture that forms a beam that is steerable in elevation. In another embodiment, the CPE is comprised of at least one antenna-aperture that forms a beam that is switched-beam in azimuth. In another embodiment, the CPE is comprised of at least one antenna-aperture that forms a beam that is switched-beam in elevation. In another embodiment, the CPE is comprised of at least one antenna-aperture that forms a fixed-beam in azimuth. In another embodiment, the CPE is comprised of at least one antenna-aperture that forms a fixed-beam in elevation. In one variation of the embodiments, the CPE antenna-aperture also uses a mechanically steerable mechanism to steer the CPEs beams. In another variation of the embodiments, the CPE comprises of at least two antenna-apertures, one antenna-aperture is a client-antenna-aperture, and at least one aperture is a relay-antenna-aperture.

Figure 8A:
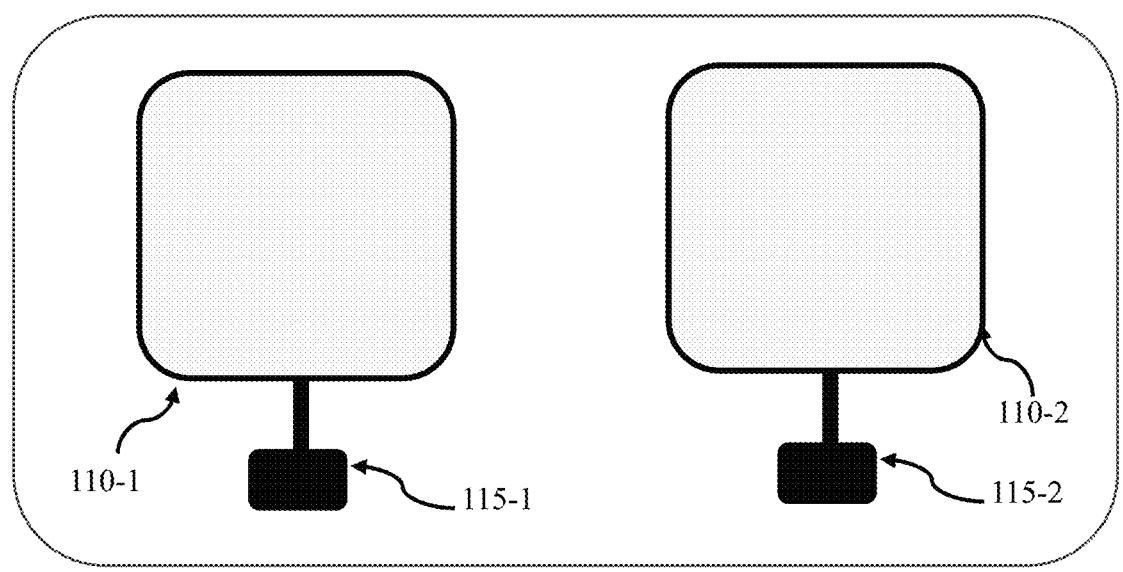
FIG. 8A is a graphical depiction of an exemplary AP/CPE antenna sub-system design, according to some embodiments.

FIG. 8A illustrates a CPE antenna sub-system design comprised of two antenna-apertures 110-1 and 110-2, equipped with mechanical steering devices 115-1 and 115-2 respectively. In one embodiment, at least one of the two apertures form a beam that is fixed-beam in azimuth. In another embodiment, at least one of the two apertures form a beam that is fixed-beam in elevation. In another embodiment, at least one of the two apertures form a beam that is switched-beam in azimuth. In another embodiment, at least one of the two apertures form a beam that is switched-beam in elevation. In another embodiment, at least one of the two apertures form a beam that is steerable in azimuth. In another embodiment, at least one of the two apertures form a beam that is steerable in elevation. In one variation of the embodiment, mechanical steering mechanism 115-1 points the center of the antenna-aperture 110-1 toward one angular position, and mechanical steering mechanism 115-2 points the center of the antenna-aperture 110-2 toward another angular position. In another variation of the embodiment, one antenna-aperture is a client-antenna-aperture and the other aperture is a relay-antenna-aperture.

Figure 8B:
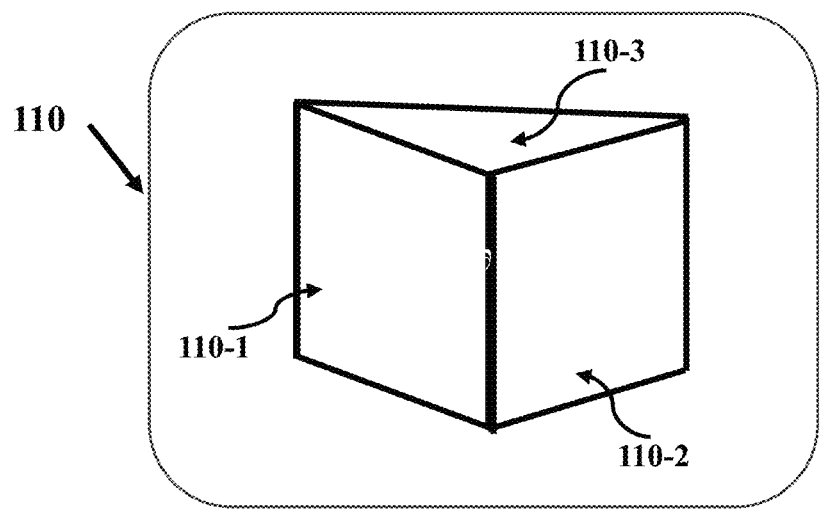
FIG. 8B is a graphical depiction of an exemplary AP/CPE antenna sub-system design, according to some embodiments.
Figure 8C:
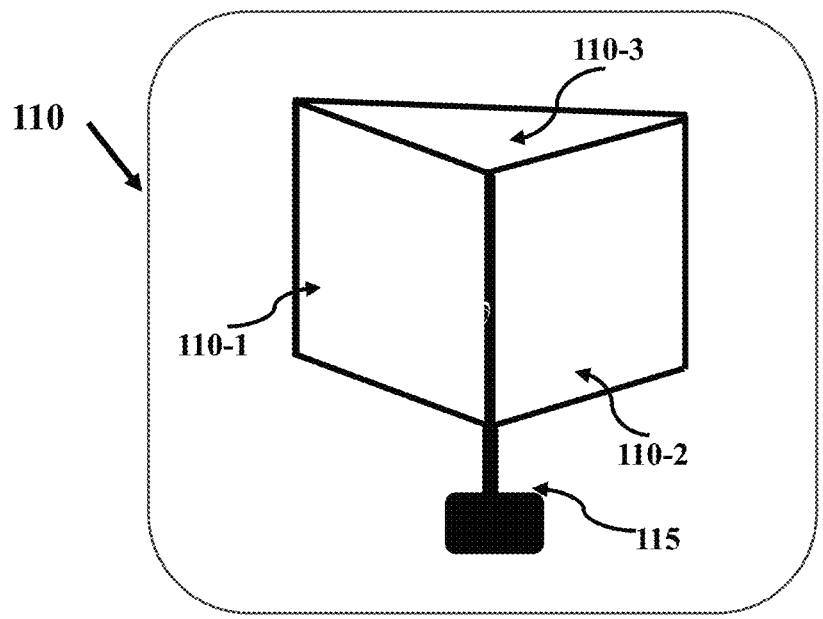
FIG. 8C is a graphical depiction of an exemplary AP/CPE antenna sub-system design, according to some embodiments.

FIG. 8B illustrates a CPE antenna sub-system comprised of three antenna-apertures 110-1, 110-2 and 110-3. In one embodiment, one of the antenna-apertures is a client-antenna-aperture, and two apertures are relay-antenna-apertures. In one embodiment, at least one antenna-aperture forms a beam that is steerable in azimuth. In a variation of the embodiment, at least one antenna-aperture forms a beam that is switched-beam in azimuth. In another embodiment, at least one antenna-aperture forms a beam that is steerable in elevation. In another embodiment, at least one antenna-aperture forms a beam that is switched-beam in elevation. FIG. 8C illustrates a CPE antenna sub-system comprised of three antenna-apertures 110-1, 110-2 and 110-3, and a mechanically steerable mechanism 115. In one embodiment, one aperture is a client-antenna-aperture and the mechanical steerable mechanism points the center of the antenna-aperture toward a specific angular position.

Medium Access Control

Figure 9A:
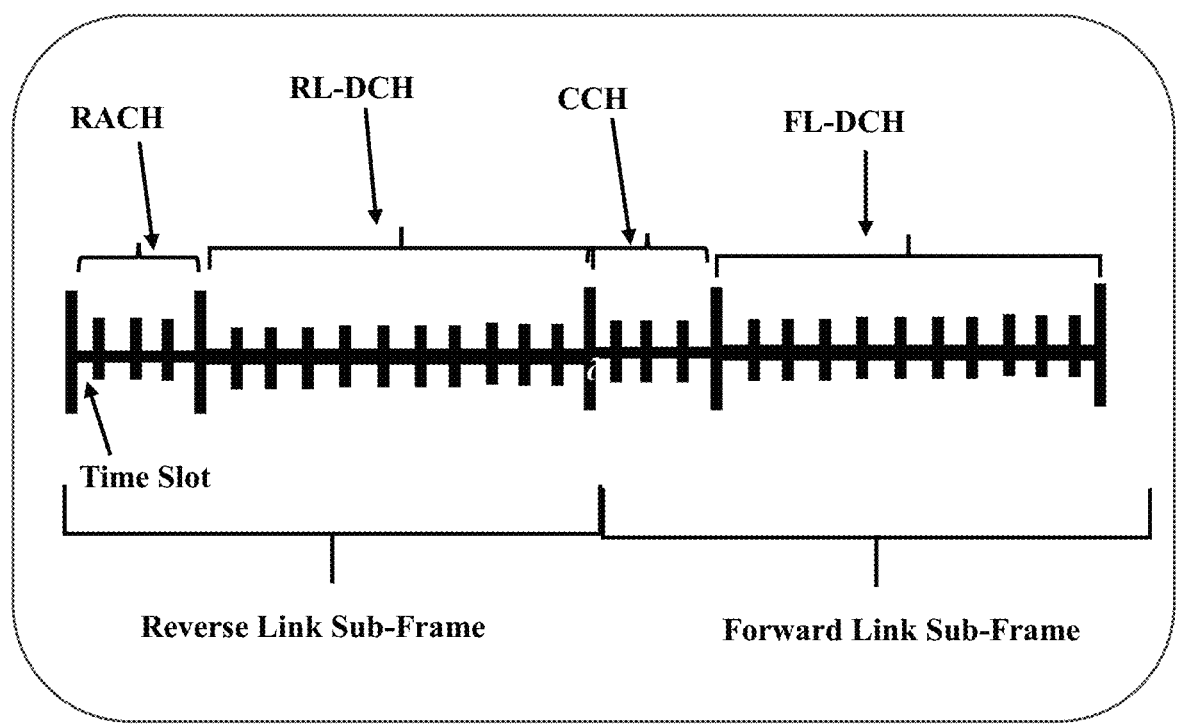
FIG. 9A is a graphical depiction of an exemplary division of time into sub-frames and information channels for reverse link and forward link transmission directions in a TDD system, according to some embodiments.

The frame timing of an exemplary TDD system, as depicted in FIG. 9A, is divided into two sub-frames, during one sub-frame the AP or the relay-mode-CPE transmit (on forward link) to client-mode-CPEs, during the other sub-frame the AP or the relay-mode-CPE receive (on reverse link) from client-mode-CPEs. Each of the said sub-frames is further divided into smaller units of time, referred to as time slots. Each forward link sub-frame is divided into time-intervals, referred to as channels. One time-interval is used to broadcast system related information as well as CPE specific information such as response messages to CPEs for the CPE's messages, referred to as the Control CHannels (CCH). Another time-interval is used to send data to specific client-mode-CPEs, referred to as the Forward link Data CHannel (FL-DCH). Examples of messages sent by the client-mode-CPEs are the association request message requesting to establish a communications link with an AP/relay-mode-CPE, registration request message, and the bandwidth request message requesting that the AP/relay-mode-CPE with which the client-mode-CPE is communicating reserve time slots (bandwidth) on the reverse link for the said client-mode-CPE.

In some embodiments, the AP or the relay-mode-CPE send a Reference Signal (RS) associated with each CCH channel in certain time slots of the CCH on the forward link.

The client-mode-CPEs search for the RS signals sent by the APs/relay-mode-CPEs, synchronize their receiver timing to the RS signal, and decode the CCH messages corresponding to the reference signal detected. The RS signal is also known by those skilled in the art as beacon signal, pilot signal, pre-amble signal, mid-ample or others terms. The CCH is also known to those skilled in the art by names such as paging or beacon channel. The reverse link sub-frame is also further divided into time intervals, referred to as channels. One time-interval is used by the client-mode-CPEs to transmit signaling messages to the AP or the relay-mode-CPE, referred to as Random Access Channel (RACH). Another time-interval is used by the client-mode-CPEs to send scheduled data, referred to as the Reverse link Data CHannel (RL-DCH).

Figure 9B:
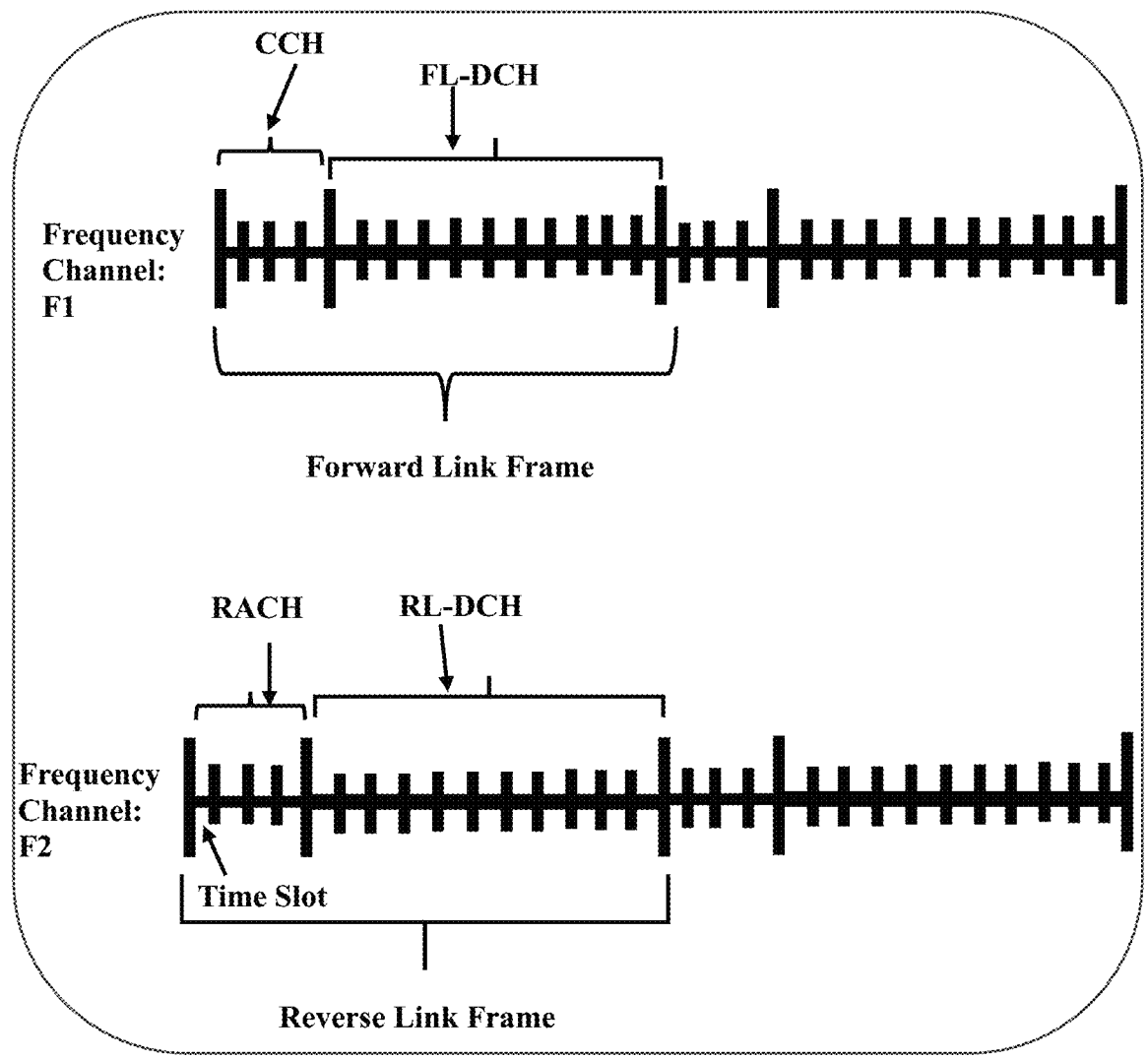
FIG. 9B is a graphical depiction of an exemplary division of time into frames and information channels for reverse link and forward link transmission directions in an FDD system, according to some embodiments.

FIG. 9B is an exemplary illustration of division of time, for an FDD system, into forward link and reverse link frames, and division of frames into the CCH, FL-DCH, RACH and RL-DCH channels. As shown in FIG. 9B, forward link channels are, in an FDD system, sent on one carrier frequency, labeled by F1, and the reverse link information channels on a different carrier frequency, labeled by F2.

In one embodiment, the CCH is transmitted over a wide beam, such as the beam illustrated in FIG. 4D, that covers the whole sector; during the CCH transmission, all CPEs in the sector will detect the CCH messages. In another embodiment, the CCH is sequentially transmitted over multiple beams, each beam covering one sub-sector of a sector as illustrated by FIG. 4C, so that all CPEs within the coverage of the sector will receive the CCH during at least one of the CCH transmissions on one of the beams. In one embodiment, the AP/relay-mode-CPE receives the RACH channel on a sector-wide transmit beam. In another embodiment, the AP/relay-mode-CPE searches for the RACH on an AP/relay-mode-CPE sector-wide receive beam. In another embodiment, the AP/relay-mode-CPE sequentially searches for the RACH on each of a multitude of receive beams within a sector. In another embodiment, the client-mode-CPE transmits on the RACH channel on a beam pointing toward the AP/relay-mode-CPE. In a variation of the embodiment, the client-mode-CPE retransmits the message on the RACH channel until it receives an acknowledgement for the said messages from the AP/relay-mode-CPE with which the client-mode-CPE is communicating.

If the CCH channels of different AP/Relay-mode-CPEs are transmitted during the same time slots, then a client-mode-CPE may receive interference from other CCH channels while trying to acquire a specific CCH channel. The interference from other CCH channels will be potentially higher when CCH channels are transmitted on sector-wide beams such as the beam shown in FIG. 4D. In one embodiment, each sector of an AP/CPE is divided into narrower sub-sectors, and each sub-sector is covered by one narrow beam, as illustrated by FIG. 4C, and the CCH channel is transmitted on the sub-sectors.

In one embodiment for reducing the interference received from other CCH channels. The time slots allocated to the CCH channel are divided into a number of disjoint sets of time slots, the different sets of time slots are assigned to different sectors/sub-sectors of an AP/CPE such that there is at least one sector/sub-sector separating the sectors/sub-sectors that use the same set of time slots, only the AP/CPE sectors/sub-sectors assigned to one set of time slots will send CCH during the said set of time slots. The scheme described in the preceding embodiment is referred to as time-slot-reuse scheme. In a variation of the embodiment, each AP/CPE is assigned a color from a set of colors, colors are assigned to APs/CPEs in the network such that a minimum distance is maintained between APs/CPEs with the same color, the sectors/sub-sectors of the APs/CPs are numbered, the same numbering system is applied to all APs/CPEs, the same set of CCH time slots are not used in the same sector/sub-sector number of APs/CPEs with different colors.

In one embodiment, the data rate at which the CCH channel is transmitted is chosen such that the messages on the CCH channel be decodable correctly with a probability higher than a specified value within the coverage area of each sector.

In one embodiment, one radio sub-system is shared by multiple antenna-apertures, time frames are divided into antenna-aperture specific time frames, as illustrated by FIG. 9C, referred to as antenna-aperture-j-frame, j an integer index identifying different antenna-apertures, during a forward link antenna-aperture-j-frame an AP or a relay-mode-CPE transmits to the client-mode-CPE associated with the j-th antenna-aperture, and during the reverse link antenna-aperture-j-frame an AP or a relay-mode-CPE receives from the client-mode-CPE associated with the j-th antenna-aperture. There are two types of antenna-aperture-j-frames, one is the reverse link antenna-aperture-j-frame and the other the forward link antenna-aperture-j-frame. In other words, the forward link and reverse link frames are further divided into antenna-aperture specific forward link and reverse link frames as described above. The switching sub-system 160, depicted in FIG. 5, switches the radio sub-system 120 from one antenna-aperture to another for each of the antenna-aperture specific forward link and reverse link frames.

System Acquisition Phase

During the initial CPE installation, a CPE radio sub-system searches for RSs transmitted by other APs or Relay-mode-CPEs, in order to determine the AP/relay-mode-CPE with which to communicate. The CPE that has been installed and has established a communications link with an AP or a relay-mode-CPE, may periodically, or based on certain triggers such as when the received RS signal strength from the relay-mode-CPE with which it is communicating drops below a threshold, search for another AP or relay-mode-CPE from which it may receive a higher signal strength. The phase where the CPE is searching for an RS to determine the "best" AP/relay-mode-CPE with which to communicate is referred to as the acquisition phase in this disclosure. In one embodiment, the azimuthal angular range that covers one sector is further divided into a number of fixed sub-sectors, each sub-sector is covered by one antenna-aperture beam, and each relay-mode-CPE or AP periodically transmits a control channel carrying system parameter messages on each of the beams covering the sub-sectors. In a variation of the embodiment, the CPE radio sub-system points a beam toward a sub-sector within the CPE's sector for a time interval larger than the period that the APs/relay-mode-CPEs transmit the RS in a sub-sector times the number of sub-sectors, referred to as the listen-time-interval in this disclosure. The listen-time-interval is at least as long as the time interval during which the AP/relay-mode-CPE will have sent at least one RS over each sub-sector of a sector.

In one embodiment, if the client-mode-CPE does not detect an RS during the listen-time-interval, the client-mode-CPE then points a beam toward a different CPE sub-sector of the same antenna-aperture, or to a sub-sector of another antenna-aperture of the same client-mode-CPE, and searches for an RS during the next listen-time-interval. In a variation of the embodiment, the client-mode-CPE in the acquisition phase searches for RSs on all sub-sectors of all its antenna-apertures, stores the signal strength of the RS signals it detects, ranks the detected RS signals according to a received signal strength, chooses the AP/CPE from which it receives the RS with the highest signal strength, transmits an association request message on the RACH channel to the AP/relay-mode-CPE from which it receives the highest signal strength, and starts communications with the said AP/relay-mode-CPE upon receiving an association acknowledgement message from the said AP/relay-mode-CPE.

In one embodiment, a CPE maintains the position location coordinates of all APs and other CPEs that have already been deployed in the network, points its beam toward the position of each AP/CPE, searches for the RS transmitted by each AP/CPE during the listen-time-interval, measures the signal strength received on the RS from each AP/CPE, and establishes a link with the AP/CPE from which it receives the highest signal strength.

In one embodiment, the CPE antenna-aperture beam is a fixed-beam, and the CPE antenna sub-system uses a mechanical steering mechanism to point the said CPE's beam toward different sub-sectors. In another embodiment, the CPE antenna-aperture beam is switched-beam, and the CPE radio sub-system instructs the CPE antenna sub-system to sequentially point the said CPE's beam toward different sub-sectors, and to search for RSs during the listen-time-interval.

The set of APs/CPE whose RS signals are detectable at a CPE is referred to as the said CPE's detectable-RS-list. The set of CPEs which can detect the RS signal of a second AP/CPE is referred to as the second AP/CPE's reachable-CPE-list.

In one embodiment, the RS signal strength received at a first CPE from each AP/CPE in the network is estimated using knowledge of the position location coordinates of the APs/CPEs, and if the estimated RS signal received from an AP/CPE is above a threshold the said RS is added to the first CPE's detectable-RS-list. In another embodiment, the RS signal strength received from each AP/CPE in the network at a second AP/relay-mode-CPE is estimated using knowledge of position location coordinates of the APs and CPEs, and if the estimated received RS signal strength of an AP/CPE is above a threshold the said AP/CPE is added to the second AP/CPE's reachable-CPE-list. In another embodiment, the position location coordinates of a new CPE being installed are send to all APs and existing CPEs, each AP/CPE uses the position location information of APs/CPEs to estimate the received AP's/CPE's RS signal strength at the new CPE, and if the estimated signal strength is above a threshold, the new CPE is added to the AP/CPE's reachable-CPE-list. In another embodiment, the APs and CPEs add the CPEs and APs whose RS they detect to their reachable-CPE-list and detectable-RS-list lists.

In one embodiment, the APs/relay-mode-CPEs use the position location coordinates of the CPEs in their reachable-CPE-list to determine the angular position of the said CPEs, periodically point a beam toward the angular position of the CPEs in their reachable-CPE-list, and transmit an RS on the beam that is pointing toward a CPE in the reachable-CPE-list. In a variation of the embodiment, the new CPE being installed points a beam toward the AP/CPE in its detectable-RS-list with highest estimated received RS signal strength, searches for the RS signal from the said AP/CPE, detects and synchronizes to the said RS signal, sends an association request message to the said AP/CPE, and starts communications with the said AP/CPE upon receiving an association acknowledge message from the said AP/CPE.

AP/Relay-Mode-CPE to Client-Mode-CPE Assignment and Time-Slot-Reuse Scheduling

Figure 10A:
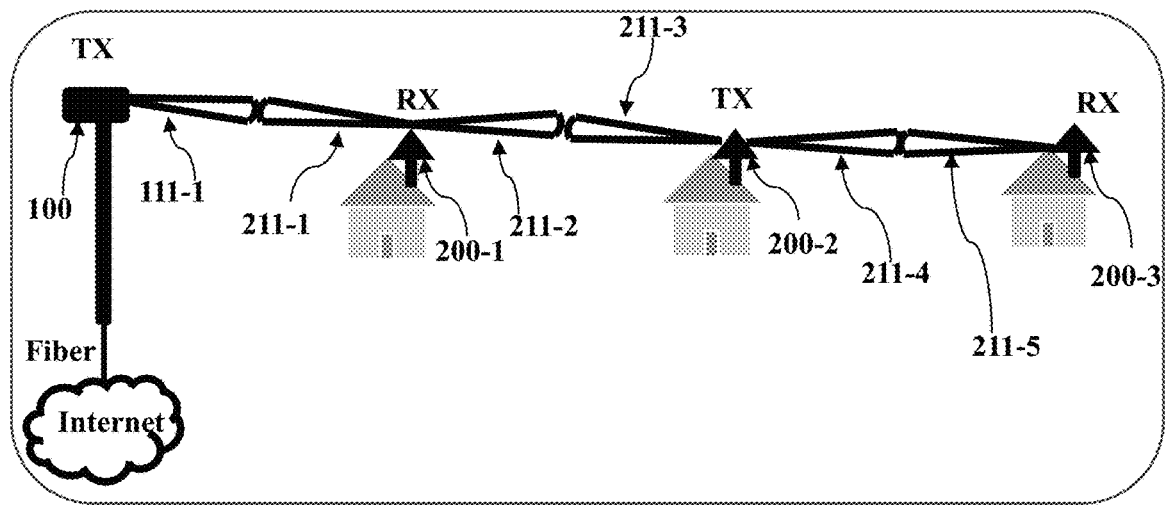
FIG. 10A is a graphical depiction of an exemplary arrangement of APs/CPEs into transmit (TX) and receive (RX) phases in a TDD system, according to some embodiments.

FIG. 10A depicts position of a number of CPEs in the mesh network, where CPE 200-3 communicates with the internet via CPEs 200-1, 200-2 and AP 100. As described previously, in one embodiment APs and CPEs in alternative layers of the network are either in TX or RX mode. FIG. 10A illustrates a TDD system where AP 100 and CPE 200-2 are in transmit (TX) mode and CPEs 200-1 and 200-3 are in receive (RX) mode, with labels TX and EX above the corresponding AP and CPE symbols. AP 100 and CPE 200-2 are transmitting on beams 111-1, 211-3 and 211-4. Since CPE 200-3 is receiving on beam 211-5 from beam 211-4 of CPE 200-2 and beam AP 111-1 of AP 100 is also aligned in the same direction as beam 211-4 of CPE 200-2, then CPE 200-3 will receive interference from beam 111-1 of AP 100 while receiving data from CPE 200-2. Due to the higher relative distance between CPE 200-3 and AP 100 versus CPE 200-3 and 200-2, the interference received by CPE 200-3 from AP 100 may be below the threshold that results in high packet error rate at the receiver. However, if the interference is above the acceptable threshold, then systems and methods are needed to mitigate the interference.

Figure 10B:
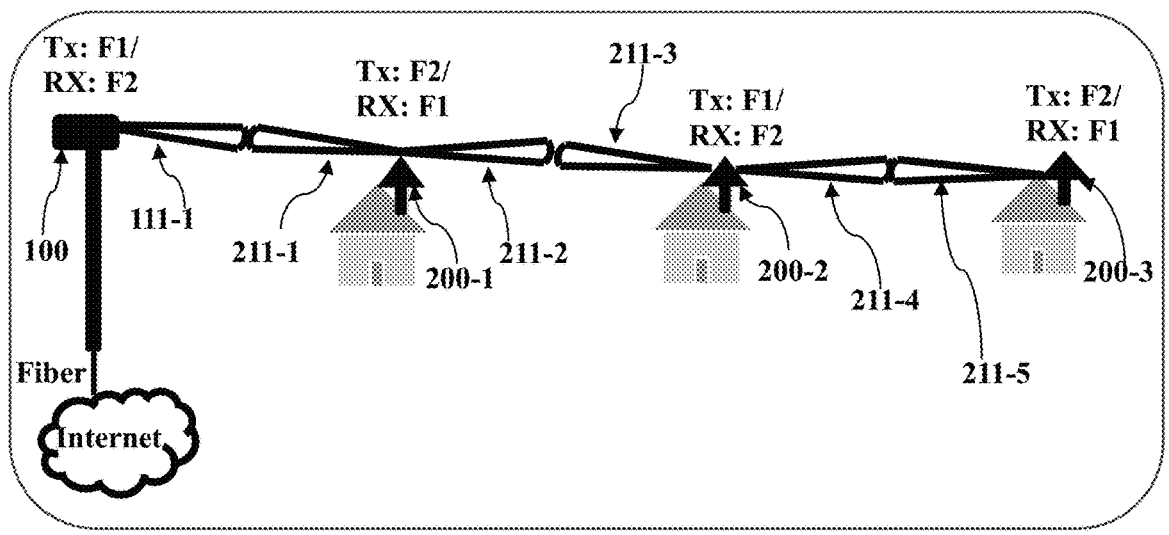
FIG. 10B is a graphical depiction of an exemplary assignment of transmit and receive carrier frequencies for APs/CPEs in an FDD system, according to some embodiments.

FIG. 10B considers the AP/CPE configuration of FIG. 10A for an FDD system, where the APs/CPEs are assigned to different carrier frequencies, F1 and F2, and simultaneously transmit and receive on different carrier frequencies. In one embodiment, the APs/CPEs in odd layers transmit (TX) on F1 and receive (RX) on F2, and APs/CPEs in even layers transmit o F2 and receive on F1. FIG. 10B shows labels TX:F1/RX:F2 and TX:F2/RX:F1 above the symbols representing the different APs and CPEs, identifying the transmit and receive carrier frequencies assigned to each AP/CPE according to their layers.

The following terminology is defined to facilitate description of the forthcoming embodiments.

Time-slot-reuse schedule. Refers to a division of the available time slots into a number of disjoint sets, each set is assigned to a different device, where each device only transmits on its assigned time slots.

Link-assignment. Refers to a one-to-one mapping of client-mode-CPEs and AP/relay-mode-CPEs, and a time-slot-reuse schedule between the client-mode-CPE and its AP/relay-mode-CPE pair.

Interfered-CPE. A CPE whose received SINR, subject to a link-assignment, is below a predefined threshold. For a given link-assignment, a central controller computes the received SINR at each AP/CPE, assuming all AP/CPEs in TX state in a TDD system are transmitting during a time slot, or all AP/CPEs in an FDD system are transmitting on their assigned transmit carrier frequencies.

Interfered-CPE-list. The list of interfered-CPEs for a given link-assignment.

CPE-interferer-list. For each receiving CPE, the set of transmitting APs/CPEs in a link-assignment whose received signal strength at the said CPE is above a threshold. The list is sorted in decreasing received signal strength.

Acceptable-link-assignment. A link-assignment that contains no interfered-CPEs.

The following embodiment describes a procedure for generating an acceptable-link-assignment from a link-assignment that contains at least one interfered-CPE. In one embodiment, the central controller follows a two-step process:

1. an iterative procedure, wherein for each CPE in the interfered-CPE-list, the central controller examines removing the said CPE from the CPE-interfered-list by reassigning the client-mode-CPEs of the APs/CPEs in the CPE-interferer-list, starting from the top of the list, to a different AP/relay-mode-CPE until the said CPE is removed from the interfered-CPE-list, without causing another CPE to become an interfered-CPE, resulting in a new link-assignment;
2. if the link-assignment generated in the first step contains interfered-CPEs, then a time-slot-reuse schedule is imposed on the APs/CPEs in the CPE-interferer-list of the link-assignment from the first step to remove the remaining interfered-CPEs.

When a new CPE is installed, an AP/CPE is removed from the network, or a client-mode-CPE is reassigned, a new link-assignment is formed. The new link-assignment will need to be examined for existence of interfered-CPEs, and the said link-assignment will be iterated per previous embodiment to remedy any interfered-CPEs.

Data Rate Determination

In one embodiment, a first AP/CPE receiver estimates the received signal strength, such as SINR, from a second AP/CPE with which the first AP/CPE is communicating, determines the highest data rate at which the receiver is able to decode the data packets correctly with a specified probability, informs the second AP/CPE of the determined data rate, and the second AP/CPE transmits data packets at the said determined data rate. The data rate determined in the previous embodiment is referred to as the AP/CPE nominal data rate in this disclosure.

Self-Configurable and Self-Healing Network

The previous embodiments described systems and methods to enable the CPEs to autonomously search for the RSs of the existing APs and relay-mode-CPEs in the network, to determine the AP/relay-mode-CPE from which the said CPE receives the highest signal strength, and to establish a connection with the said AP/relay-mode-CPE. In another embodiment, when a new AP/CPE is installed, the central controller instructs all client-mode-CPEs within a specific distance from the new AP/CPE to search for the RS of the new AP/CPE, estimate the signal strength of the detected RS signal, determine if the estimated RS signal strength is higher than that of the RS of the AP/relay-mode-CPE with which the client-mode-CPE is communicating, and choose the AP/relay-mode-CPE with higher RS signal strength with which to communicate. Therefore, the systems and methods described in previous embodiments allow the CPE to self-configure in the sense of autonomously finding the "best" AP/relay-mode-CPE with which to communicate. The self-configuration characteristic of the CPEs reduces the need for manual intervention by an installer, and therefore reduces the cost of initial installation and configuration of the CPE in a network. Self-configuration also enables the client-CPEs to autonomously search for the "best" AP/relay-mode-CPE with which to communicate as the network evolves, thereby maintaining high network performance.

In one embodiment, when the received signal strength from the AP/relay-mode-CPE with which a client-mode-CPE is communicating falls below a threshold, the client-mode-CPE radio sub-system moves into system acquisition phase, determines the AP or the relay-mode-CPE from which it receives the highest signal strength, and establishes communications link with the said AP/relay-mode-CPE. In another embodiment, when the received signal strength from the AP/relay-mode-CPE with which a client-mode-CPE is communicating falls below a threshold, the central controller entity determines a new AP/relay-mode-CPE from which the said second CPE will receive higher signal strength, and instructs the client-mode-CPE to establish a communications link with the said new AP/relay-mode-CPE. The network is said to be self-healing in the sense that a CPE autonomously detects low received signal strength, the CPE or the network determine an AP/relay-mode-CPE from which the said CPE will receive a higher signal strength, and the said CPE establishes connection with the new AP/relay-mode-CPE.

As described previously, in some embodiments CPEs installed at premises provide connectivity to other CPEs in the network in a mesh networking configuration. In this configuration, if an AP or relay-mode-CPE which provides connectivity to a client-mode-CPE temporarily loses electricity, then connectivity to the client-mode-CPE will be lost unless a measure is taken to overcome power outage at the Relay-mode-CPE. Some premises, e.g. houses, may discontinue their service and remove their CPEs, resulting in loss of connection to any client-mode-CPEs that use the removed CPEs as their rely-mode-CPEs. Therefore, systems and methods are needed for the client-mode-CPEs to autonomously find another AP/-rely-mode-CPE with which to communicate.

In one embodiment, the client-mode-CPE radio sub-system enters system acquisition phase upon loss of connection to the relay-mode-CPE with which it is communicating, begins search for RSs of APs and relay-mode-CPEs, determines the AP or the relay-mode-CPE from which it detects signal strength above a threshold, and establishes communications with the said AP or relay-mode-CPE. In another embodiment, upon loss of connection, the client-mode-CPE chooses the AP or the relay-mode-CPE in its detectable-RS-list with the highest signal strength and establishes communications with the said AP or relay-mode-CPE. In another embodiment, the CPEs are equipped with rechargeable batteries, the electronics equipment of the CPE in power outage switches to the battery as the source of energy, and connectivity is maintained to the CPE in power outage and to the client-mode-CPEs of the CPE in power outage.

AP/CPE Frame Timing Synchronization

In some embodiments described previously, the timing of different radio sub-systems of the same AP/CPE and the radio sub-systems of different APs/CPEs need to be synchronized. In one embodiment, GPS receivers are included in the AP/CPE equipment. The GPS receiver is used to synchronize the different radio sub-systems. In another embodiment, a first AP/relay-mode-CPE is chosen as anchor AP/relay-mode-CPE, a second AP/relay-mode-CPE detects the RS timing of the first AP/relay-mode-CPE and synchronizes its frame timing to that of the first AP/relay-mode-CPE. In a variation of the embodiment, a second AP/relay-mode-CPE synchronized to the anchor AP/relay-mode-CPE also acts as an anchor AP/relay-mode-CPE, and other APs/relay-mode-CPEs synchronize their frame timing to that of the said second AP/relay-mode-CPE.

Solar Energy Enabled APs/CPEs and Power Save Mode

CPEs equipped with solar panels may be installed in locations where it is difficult to get access to electricity, thereby enabling more nodes in the network to help establish a mesh network. Since the amount of solar energy generated by the solar panels is dependent on the weather conditions, the rechargeable battery that is used to store the solar energy must be chosen to have adequate storage so that the battery energy will last over periods of time where solar power generation is small due to weather conditions. Statistics of the solar panel power generation efficiency are needed in each region to determine the required solar panel power rating and the battery energy storage capacity. One aspect of the CPE design that can be optimized to minimize the solar panel power rating and the battery energy storage requirement is the energy usage of the CPE electronics. In order to minimize the size of the required solar panel and that of the rechargeable battery, the CPE radio sub-system uses a power save mechanism, wherein the communications equipment of the AP/CPE is turned off during time intervals where there is no data to transmit/receive.

In one embodiment, time on the forward link is, as illustrated in FIG. 9A, divided into sub-frames, a CCH sub-frame and a FL-DCH sub-frame. In another embodiment, the AP or the relay-mode-CPE radio sub-system schedules data packet transmissions to the client-mode-CPEs on the forward link, forms a message, referred to as the Scheduling Message (SM) in this disclosure, the SM includes the identification number of each client-mode-CPE that will receive data packets in the current forward link DC-DCH sub-frame, and sends the SM message during a pre-defined set of time slots within the CCH or the FL-DCH channel to inform the said client-mode-CPEs that they will receive data packets in the current forward link FL-DCH sub-frame. In another embodiment, the client-mode-CPEs decode the SM message, and if a client-mode-CPE detects its identification number in the SM message, and the client-mode-CPE retrieves its data from the FL-DCH sub-frame of the corresponding forward link frame. In a variation of the embodiment, the client-mode-CPE radio sub-system is only receiving during the SM message decoding and during the time slots where the CPE is receiving data packets, and is otherwise in the sleep mode where the CPE radio sub-system has turned off its receiver to conserve energy. In another embodiment, the SM message also contains the slot numbers of the time slots within the forward link FL-DCH channel which carry the data packet for the said CPE identification number, the client-mode-CPE receiver is powered on (awake mode) only during the time slots that carry data packets for the said CPE, and is turned off (sleep mode) during the other Fl-DCH time slots to conserve energy. In another embodiment, the AP or the relay-mode-CPE transmitter is turned off during the time slots that the AP/CPE is not transmitting CCH or data packets, and is said to be in sleep mode in this disclosure.

In one embodiment, the client-mode-CPEs send reservation request messages to the AP or the relay-mode-CPE to request time slot assignments on the RL-DCH channel where the client-mode-CPE will send data packets to the AP or the relay-mode-CPE, and the AP/relay-mode-CPE sends a reservation grant message to the client-mode-CPE with information on time slots on the RL-DCH assigned to the client-mode-CPE. In a variation of the embodiment, a client-mode-CPE only transmits during the RACH time slots and during the RL-DCH time slots assigned to the said client-mode-CPE, and during the remaining time slots the CPE transmitter is turned off. In another embodiment, the AP and relay-mode-CPE receivers are also on during the RACH channel time slots and the RL-DCH time slots that have been assigned to client-mode-CPEs to transmit on the reverse link and are turned off (in sleep mode) during the remaining time slots.

Once the battery energy storage and the solar panel power rating sizes have been determined for the energy usage statistics of the electronics equipment and the weather conditions of the region the CPE is being deployed, there will be a small probability that the battery will run out of power. The average data rate achieved by a CPE is defined, in this disclosure, to be the nominal data rate at which the CPE transmits times the percentage of time the CPE is in awake mode and is transmitting data. In one embodiment, for preventing the battery from running out of energy, the AP/CPE radio sub-system reduces the average data rate achieved by the AP/CPE whenever the battery energy drops below a threshold. In a variation of the embodiment, multiple battery energy thresholds are specified, an average data rate is associated with each battery energy threshold, and the AP/CPE average data rate is reduced to the one corresponding to a battery energy threshold when the battery energy drops below the corresponding threshold. In another variation of the embodiment, the lower average data rate is achieved by transmitting data at the nominal data rate but at a smaller fraction of time.

Mitigating Beam Gain Loss Due to Wind Loading

Wind may move the antenna-aperture of the AP/CPE and result in pointing the boresight of antenna-aperture beam away from the receiver, thereby losing antenna beam gain toward the receiver. The potential for beam pointing loss due to wind is higher for narrower AP/CPE beam beamwidths. In one embodiment, the AP/CPE receiver antenna-aperture comprises of multiple antenna-elements, the phase and gain of beam forming coefficient of each antenna-element is set by the radio sub-system to steer the receive beam in specific angular directions, a reference signal is transmitted at the beginning of the message being transmitted by the transmitting AP/CPE, the receiver uses the reference signal to synchronize to the received signal, during reception of the reference signal the receiver sequentially changes the beam forming coefficients of the antenna-elements to point the beam in one of a multitude of beam positions, measures the received reference signal strength at each of the said beam positions, chooses the beam position with the highest signal strength, sets the antenna-element coefficients to the values corresponding to the beam position with the highest received signal strength, and uses the corresponding beam position to receive the data packet/message following the reference signal. In another embodiment, during the transmit phase, the AP/CPE radio sub-system sets the coefficients of the antenna-elements to form a transmit beam toward the same angular position that maximizes the received signal strength as determined during the receive reference signal described in the previous embodiment.

What is claimed is:

1. A system for providing wireless broadband access to premises, comprising: a network of Access Points (APs) comprising a radio sub-system, and an antenna subsystem comprised of at least one antenna-aperture, each antenna-aperture capable of forming and pointing at least one beam;

CPEs capable of two concurrent functional modes, relay-mode-CPE when transmitting data on the forward link direction to other CPEs, and client-mode-CPE when receiving data on 15 the reverse link direction from APs or relay-mode-CPEs;

CPEs comprising a radio sub-system, and an antenna sub-system comprised of one client-antenna-aperture and at least one relay-antenna-aperture, the client-antenna-aperture capable of forming a one beam and pointing the beam within 360 degrees in azimuth, the relay-antenna-aperture capable of forming and pointing at least one beam;

the radio sub-system comprised of an RF transceiver, a beam forming sub-system, a baseband sub-system and a processor sub-system, capable of transmitting a reference signal, and receiving and estimating signal strength of reference signals;

the an azimuthal angular range that covers one sector is further divided into at least one sub-sector, each sub-sector is covered by one beam, and each AP or relay-mode-CPE periodically transmits a reference signal on each of the beams covering its sub-sectors; and the client-antenna-aperture sequentially points a beam toward each sub-sector, searches for reference signals on each sub-sector, estimates the signal strength of detected reference signals, sends an association request message to the AP/relay-mode-CPE from which it receives the highest reference signal strength, and upon reception of association request message acknowledgement from the AP/relay-mode-CPE establishes communications with the said AP/relay-mode-CPE.

2. The system of claim 1, wherein: the client-mode-CPE maintains the position location coordinates of all APs and other CPEs in the network; and the client-mode-CPE sequentially points its beam toward the position of each AP/CPE, searches for the reference signal transmitted by each AP/CPE, estimates the signal strength received on the reference signal from each AP/CPE, and establishes a communications link with the AP/CPE from which it receives the highest signal strength.

3. The system of claim 2, wherein:
the AP antenna-aperture is comprised of at least one row and one column of antenna-elements; one RF signal is applied to each column of antenna-elements, the said signal further split among the elements within the column; and phases and gains of signals applied to each element are set to form a beam that is steerable in azimuth and switched-beam in elevation.

4. The system of claim 2, wherein the client-antenna-aperture forms a fixed-beam in azimuth, and points the beam in azimuth using a mechanical steering mechanism.

5. The system of claim 4, wherein the client-antenna-aperture beam is steerable in elevation.

6. The system of claim 2, wherein the antenna-aperture forms a beam that is switched-beam in azimuth and steerable in elevation.

7. The system of claim 1, wherein:
the AP antenna-aperture is comprised of at least one row and one column of antenna-elements;
one RF signal is applied to each column of antenna-elements, the said signal further split among the elements within the column; and
phases and gains of signals applied to each element are set to form a beam that is steerable in azimuth and switched-beam in elevation.

8. The system of claim 1, wherein the client-antenna-aperture forms a fixed-beam in azimuth, and points the beam in azimuth using a mechanical steering mechanism.

9. The system of claim 8, wherein the client-antenna-aperture beam is steerable in elevation.

10. The system of claim 1, wherein the client-antenna-aperture forms a beam that is switched-beam in azimuth and steerable in elevation.

* * * * *